US00RE47916E

(19) United States
(12) Reissued Patent
Uchino et al.

(10) Patent Number: US RE47,916 E
(45) **Date of Reissued Patent: *Mar. 24, 2020**

(54) DISPLAY APPARATUS AND ELECTRONIC APPARATUS

(71) Applicant: Sony Corporation, Tokyo (JP)

(72) Inventors: Katsuhide Uchino, Kanagawa (JP); Tetsuro Yamamoto, Kanagawa (JP); Junichi Yamashita, Tokyo (JP)

(73) Assignee: Sony Corporation, Tokyo (JP)

( * ) Notice: This patent is subject to a terminal disclaimer.

(21) Appl. No.: 15/389,480

(22) Filed: Dec. 23, 2016

Related U.S. Patent Documents

Reissue of:
(64) Patent No.: 8,269,699
Issued: Sep. 18, 2012
Appl. No.: 13/285,680
Filed: Oct. 31, 2011

U.S. Applications:
(63) Continuation of application No. 15/073,888, filed on Mar. 18, 2016, now Pat. No. Re. 46,287, which is an
(Continued)

(30) Foreign Application Priority Data

Feb. 19, 2007 (JP) ..... 2007-037385

(51) Int. Cl.
*G09G 3/30* (2006.01)
*G09G 3/32* (2016.01)
(Continued)

(52) U.S. Cl.
CPC ..... *G09G 3/3233* (2013.01); *G09G 3/3266* (2013.01); *G09G 3/3291* (2013.01);
(Continued)

(58) Field of Classification Search
CPC ..... G09G 3/3233; G09G 3/3291; G09G 2300/0417; G09G 2300/043;
(Continued)

(56) References Cited

U.S. PATENT DOCUMENTS 5,684,365 A 11/1997 Tang et al.
6,229,508 B1 5/2001 Kane
(Continued)

FOREIGN PATENT DOCUMENTS

JP 08-234683 A 9/1996

*Primary Examiner* — Dennis G Bonshock
(74) *Attorney, Agent, or Firm* — Michael Best & Friedrich LLP

(57) ABSTRACT

A display apparatus includes a pixel unit in which pixels are arranged in a matrix pattern; and a driving circuit for driving the pixel unit. Each of the pixels includes a signal level holding capacitor; a first transistor that is turned on/off in response to a writing signal and via which one end of the signal level holding capacitor is connected to a signal line; a second transistor having one end of the signal level holding capacitor connected to a gate thereof and the other end of the signal level holding capacitor connected to a source thereof; a current-driven self-light-emitting element whose cathode is held at a cathode potential and whose anode is connected to the source of the second transistor; a third transistor that is turned on/off in response to a driving pulse signal; and a fourth transistor that is turned on/off in response to a control signal.

11 Claims, 23 Drawing Sheets

Related U.S. Application Data application for the reissue of Pat. No. 8,269,699, which is a continuation of application No. 12/010,926, filed on Jan. 31, 2008, now Pat. No. 8,072,397.

(51) Int. Cl.

| | |
|---|---|
| ***G09G 3/3233*** | (2016.01) |
| *G09G 3/3266* | (2016.01) |
| *G09G 3/3291* | (2016.01) |

(52) U.S. Cl.

CPC ..... *G09G 2300/043* (2013.01); *G09G 2300/0417* (2013.01); *G09G 2300/0465* (2013.01); *G09G 2300/0809* (2013.01); *G09G 2300/0819* (2013.01); *G09G 2300/0842* (2013.01); *G09G 2300/0861* (2013.01); *G09G 2310/0216* (2013.01); *G09G 2310/0262* (2013.01); *G09G 2310/06* (2013.01); *G09G 2320/0233* (2013.01)

(58) Field of Classification Search

CPC ... G09G 2300/0465; G09G 2300/0819; G09G 2300/0842; G09G 2300/0861; G09G 2310/0262; G09G 2310/06

USPC ..... 345/76, 82, 77, 83, 92

See application file for complete search history.

(56) References Cited

U.S. PATENT DOCUMENTS

| | | | | |
|---|---|---|---|---|
| 7,274,345 | B2 * | 9/2007 | Imamura et al. | 345/76 |
| 7,616,177 | B2 | 11/2009 | Peng et al. | |
| 2002/0196212 | A1 | 12/2002 | Nishitoba et al. | |
| 2004/0056828 | A1 | 3/2004 | Choi et al. | |
| 2005/0185477 | A1 | 8/2005 | Aoki et al. | |
| 2005/0237273 | A1 * | 10/2005 | Ozawa et al. | 345/76 |
| 2006/0108941 | A1 | 5/2006 | Yang et al. | |
| 2007/0146247 | A1 | 6/2007 | Huang et al. | |
| 2007/0268217 | A1 | 11/2007 | Ahn et al. | |
| 2007/0273621 | A1 | 11/2007 | Yamashita et al. | |
| 2008/0036704 | A1 | 2/2008 | Kim et al. | |

* cited by examiner

DISPLAY APPARATUS AND ELECTRONIC APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

This *application is a Continuation Reissue Application of U.S. Pat. No. 15/073,888, filed Mar. 18, 2016, which is a Reissue Application of Ser. No. 13/285,680, filed Oct. 31, 2011, now U.S. Pat. No. 8,269,699, issued Sep. 18, 2012, which* is a Continuation Application of the patent application Ser. No.: 12/010,926, filed Jan. 31, 2008*, now U.S. Pat. No. 8,072,397, issued Dec. 6, 2011*, which claims priority from Japanese Patent Application JP 2007-037385 filed in the Japanese Patent Office on Feb. 19, 2007, the entire contents of which are incorporated herein by reference.

BACKGROUND OF THE INVENTION

1. Field of the Invention

The present invention relates to a display apparatus, and can be applied to, for example, a current-driven self-light-emitting display apparatus, such as an organic EL (Electro Luminescence) element. The present invention is configured in such a way that the gate voltage of a transistor for driving a light-emitting element is set to a fixed potential, variations in the light-emission luminance due to variations in the threshold voltage of the transistor are corrected, and the fixed potential is supplied from signal lines, thereby making it possible to reduce the number of scanning lines and the number of wiring patterns of fixed potentials used in comparison with a known case.

2. Description of the Related Art

Hitherto, regarding a display apparatus using an organic EL element, various contrivances have been proposed, for example, in U.S. Pat. No. 5,684,365 and Japanese Unexamined Patent Application Publication No. 8-234683.

FIG. 15 is a block diagram showing a so-called known active-matrix display apparatus using an organic EL element. In a display apparatus 1, a pixel unit 2 is formed in such a manner that pixels (PX) 3 are arranged in a matrix pattern. In the pixel unit 2, scanning lines SCN are provided in units of lines in a horizontal direction with respect to the pixels 3 arranged in a matrix pattern, and signal lines SIG are provided for each column in such a manner as to intersect the scanning lines SCN at right angles.

As shown in FIG. 16, each pixel 3 is formed of an organic EL element 8, which is a current-driven self-light-emitting element, and a driving circuit (hereinafter referred to as a "pixel circuit") of the pixel 3, the driving circuit being used to drive the organic EL element 8.

In the pixel circuit, one end of a signal level holding capacitor C1 is held at a fixed potential, and the other end of the signal level holding capacitor C1 is connected to the signal line SIG via a transistor TR1 that is turned on/off in accordance with a writing signal WS. As a result, in the pixel circuit, the transistor TR1 is turned on in response to the rise of the writing signal WS. The other end potential of the signal level holding capacitor C1 is set to the signal level of the signal line SIG. The signal level of the signal line SIG is sampled at the other end of the signal level holding capacitor C1 and held by the signal level holding capacitor C1 at the timing at which the transistor TR1 is changed from an on state to an off state.

In the pixel circuit, the other end of the signal level holding capacitor C1 is connected to the gate of a P-channel transistor TR2, whose source is connected to a power supply Vcc, and the drain of the transistor TR2 is connected to the anode of the organic EL element 8. Here, in the pixel circuit, the transistor TR2 is set to always operate in a saturated area, with the result that the transistor TR2 constitutes a constant current circuit using a drain-source current Ids represented by the following equation:

$$Ids=(1/2)\times\mu\times(W/L)\times Cox\times(Vgs-Vth)^2 \quad (1)$$

where Vgs is the gate-source voltage of the transistor TR2, μ is the mobility, W is the channel width, L is the channel length, Cox is gate capacitance, and Vth is the threshold voltage of the transistor TR2. As a result, each pixel circuit drives the organic EL element 8 on the basis of the driving current Ids corresponding to the signal level of the signal line SIG that is sampled and held by the signal level holding capacitor C1.

The display apparatus 1 causes a write scanning circuit (WSCN) 4A of a vertical driving circuit 4 to sequentially transfer a predetermined sampling pulse and to generate a writing signal WS that is a timing signal for instructing writing into each pixel 3. A horizontal selector (HSEL) 5A of a horizontal driving circuit 5 causes a predetermined sampling pulse to be sequentially transferred to generate a timing signal, and each signal line SIG is set to the signal level of the input signal S1 by using the timing signal as a reference. As a result, the display apparatus 1 sets the terminal voltage of the signal level holding capacitor C1 provided in each pixel unit 3 in accordance with an input signal S1 in point sequence or in line sequence, and an image represented by the input signal S1 is displayed.

Here, as shown in FIG. 17, in the organic EL element 8, current/voltage characteristics change over time through use such that it becomes difficult for electric current to flow. In FIG. 17, reference character L1 denotes the initial characteristics, and reference character L2 denotes the characteristics caused by changes over time. However, when the organic EL element 8 is to be driven by the P-channel transistor TR2 in the circuit configuration shown in FIG. 16, the transistor TR2 drives the organic EL element 8 in accordance with the gate-source voltage Vgs set in accordance with the signal level of the signal line SIG, making it possible to prevent luminance changes in each pixel due to changes over time of the current/voltage characteristics.

If all the transistors constituting the pixel circuit, the horizontal driving circuit, and the vertical driving circuit are formed by N-channel transistors, these circuits can be collectively fabricated on an insulating substrate, such as a glass substrate with an amorphous silicon process. Thus, the display apparatus can be made simply and easily.

However, as shown in FIG. 18, in contrast with FIG. 16, when each pixel 13 is formed by using an N-channel type for the transistor TR2 and a display apparatus 11 is formed by a pixel unit 12 using a pixel 13, as a result of the source of the transistor TR2 being connected to the organic EL element 8, changes in the current/voltage characteristics shown in FIG. 17 cause the gate-source voltage Vgs of the transistor TR2 to be changed. As a result, in this case, electric current flowing through the organic EL element 8 gradually decreases through use, and the luminance of each pixel gradually decreases. In the configuration shown in FIG. 18, the light-emission luminance varies among the pixels due to variations in the characteristics of the transistors TR2. Variations in the light-emission luminance disturb uniformity on the display screen and are perceived as variations and roughness on the display screen.

For this reason, as a contrivance for preventing such a decrease in the light-emission luminance due to changes over time of the organic EL element and such variations in the light-emission luminance due to variations in the characteristics, a configuration shown in FIG. 19 has been proposed.

Here, in a display apparatus 21 shown in FIG. 19, a pixel unit 22 is formed in such a manner that pixels 23 are arranged in a matrix pattern. In the pixel 23, one end of a signal level holding capacitor C1 is connected to the anode of the organic EL element 8, and the other end of the signal level holding capacitor C1 is connected to the signal line SIG via-the transistor TR1 that is turned on/off in accordance with the writing signal WS. As a result, in the pixel 23, the voltage at the other end of the signal level holding capacitor C1 is set to the signal level of the signal line SIG in accordance with the writing signal WS.

In the pixel 23, one end of the signal level holding capacitor C1 is connected to the source and the other end thereof is connected to the gate of the transistor TR2, and the drain of the transistor TR2 is connected to a power supply Vcc via a transistor TR3 that is turned on/off in accordance with a driving pulse signal DS. As a result, in pixel 23, the organic EL element 8 is driven by the transistor TR2 of a source follower circuit, in which the gate potential is set to the signal level of the signal line SIG. Here, Vcat is the cathode potential of the organic EL element 8. The driving pulse signal DS is a timing signal for controlling the light-emission period of each pixel 3, and is generated by a drive scanning circuit (DSCN) 24B by sequentially transferring a predetermined sampling pulse.

Furthermore, in the pixel 23, ends of the signal level holding capacitor C1 are connected to predetermined fixed potentials Vofs and Vss via transistors TR4 and TR5 that are turned on/off in accordance with control signals AZ1 and AZ2, respectively. The control signals AZ1 and AZ2 are timing signals that are generated by control signal generation circuits (AZ1 and AZ2) 24C and 24D, each being provided in the vertical driving circuit 24, by sequentially transferring a predetermined sampling pulse.

FIG. 20 is a timing chart of one pixel 23 in the display apparatus 21. In FIG. 20, a reference character of a transistor that is turned on/off in accordance with a corresponding signal is shown for each signal. As shown in FIG. 21, in a light-emission period T1 in which the organic EL element 8 emits light, in the pixel 23, signal levels of the writing signal WS and the control signals AZ1 and AZ2 (parts (A) and (B) of FIG. 20) are made to fall to set transistors TR1, TR4, and TR5 to an off state, and the signal level of the driving pulse signal DS (part (D) of FIG. 20) is made to rise to set the transistor TR3 to an on state.

As a result, in the pixel 23, a constant current circuit that varies with a gate-source voltage Vgs resulting from the potential difference across the ends of the signal level holding capacitor C1 is formed by the transistor TR2 and the signal level holding capacitor C1, and the organic EL element 8 is made to emit light in accordance with the drain-source current Ids determined by the gate-source voltage Vgs. Thus, a luminance decrease due to changes over time of the organic EL element 8 is prevented. The drain-source current Ids is represented by equation (1) described with reference to FIG. 16. In the following, transistors are shown using symbols of switches.

When the light-emission period T1 ends, the transistors TR4 and TR5 are set to an on state in pixel 23, during the subsequent period T2, as shown in FIG. 22. As a result, in the pixel circuit 23, the potential across the ends of the signal level holding capacitor C1 is set to predetermined fixed potentials Vofs and Vss (parts (E) and (F) of FIG. 20), and the drain-source current Ids flows from the transistor TR2 to the transistor TR5 in response to the gate-source voltage Vgs resulting from the potential difference Vofs−Vss of the fixed potentials Vofs and Vss. During the period T2, the fixed potentials Vofs and Vss are set so that the potential difference across the ends of the organic EL element 8 does not become greater than a threshold voltage Vthel of the organic EL element 8, the organic EL element 8 does not emit light, and the transistor TR2 operates in a saturated area.

Next, in the pixel 23, during the predetermined period T3, as shown in FIG. 23, the transistor TR5 is set to an off state. As a result, in the pixel 23, as indicated using the broken line in FIG. 23, the voltage at the side end of the transistor TR5 of the signal level holding capacitor C1 increases in accordance with the drain-source current Ids of the transistor TR2.

As shown in FIG. 24, for the organic EL element 8, an equivalent circuit is represented by a parallel circuit of a diode and a capacitor of capacitance Cel. As a result, as shown in FIG. 25, the source voltage Vs of the transistor TR2 increases gradually in the period T3 in accordance with the drain-source current Ids of the transistor TR2. As a result, in the pixel 23, the potential difference across the ends of the signal level holding capacitor C1 is set at the threshold voltage Vth of the transistor TR2, and the terminal voltage of the signal level holding capacitor C1 on the transistor TR5 side is set to a voltage Vofs−Vth such that the threshold voltage Vth of the transistor TR2 is subtracted from the fixed potential Vofs. In this state, the anode potential Vel of the organic EL element 8 is represented by Vel=Vofs−Vth. In the display apparatus 21, the fixed potential Vofs is set so that Vel≤Vcat+Vthel is reached, with the result that the organic EL element 8 does not emit light in the period T3.

Next, in the pixel 23, as shown in FIG. 26, the transistors TR3 and TR4 are sequentially set to an off state in the subsequent period T4. By setting the transistor TR3 to an off state earlier than the transistor TR4, it is possible to suppress variations in the gate voltage Vg of the transistor TR2. Furthermore, next, in the pixel 23, in a state in which the transistor TR1 is set to an on state and the terminal voltage of the signal level holding capacitor C1 on the transistor TR5 side is thereby set to a voltage Vofs−Vth, the terminal voltage of the signal level holding capacitor C1 on the transistor TR5 side is set to the signal level Vsig of the signal line SIG.

In this case, to be accurate, the gate-source voltage Vgs of the transistor TR2 is represented by the following equation:

$$Vgs=(Cel/Cel+C1+C2)\times(Vsig-Vofs)+Vth \quad (2)$$

where C2 is the capacitance between the gate and the source of the transistor TR2. If the parasitic capacitance Cel of the organic EL element 8 is greater than the capacitance of the signal level holding capacitor C1 and the gate-source capacitance C2 of the transistor TR2, the gate-source voltage Vgs of the transistor TR2 is set to a voltage Vsig+Vth with sufficient accuracy for practical use.

As a result, in the pixel 23, the gate-source voltage Vgs of the transistor TR2 is set to a voltage Vsig+Vth such that a threshold voltage Vth is added to the signal level Vsig of the signal line SIG. As a result, in the display apparatus 21, it is possible to prevent variations in the light-emission luminance due to variations in the threshold voltage Vth, which is one of the characteristics of the transistor TR2.

Next, in the pixel 23, as shown in FIG. 27, during the fixed period T5, the transistor TR3 is set to an on state in a state in which the transistor TR1 is kept set to an on state. As a result, in the pixel 23, the transistor TR2 causes the drain-source current Ids to flow in accordance with the gate-source voltage Vgs resulting from by the potential difference across the ends of the signal level holding capacitor C1. At this time, when the source voltage Vs of the transistor TR2 is smaller than the sum of the threshold voltage Vthel of the organic EL element 8 and the cathode voltage Vcat, and the electric current that flows to the organic EL element 8 is small, as shown in FIG. 28, the source voltage Vs of the transistor TR2 increases gradually from a voltage Vs0 in accordance with the drain-source current Ids of the transistor TR2. The voltage Vs0 is represented by the following equation:

$$Vs0=Vofs-Vth+((C1+C2)/(Cel+C1+C2))\times(Vsig-Vofs) \quad (3)$$

The rate of increase of the source voltage Vs depends on the mobility μ of the transistor TR2. Cases in which the mobility is large and the mobility is small are indicated by reference characters Vs1 and the Vs2, respectively, and it can be seen that the larger the mobility, the greater the rate of increase of the source voltage Vs.

As a result, in the pixel 23, only during the fixed period T5, in a state in which the transistor TR1 is kept set to an on state, the transistor TR3 is set to an on state, and variations in the light-emission luminance due to variations in the mobility, which is one of the characteristics of the transistor TR2, are prevented.

Thereafter, as shown in FIG. 21, in the pixel 23, the transistor TR1 is set to an off state, and the organic EL element 8 is driven in accordance with the threshold voltage Vth and the gate-source voltage Vgs that is set by correcting the mobility μ. As a result, the source voltage Vs of the transistor TR2 increases as a result of the transistor TR1 being turned off up to a voltage at which the drain-source current Ids of the transistor TR2 flows to the organic EL element 8, and the organic EL element 8 starts to emit light. In consequence, the gate voltage Vg of the transistor TR2 also increases.

According to the configuration shown in FIG. 19, it is possible to prevent a decrease in the light-emission luminance due to changes over time of the organic EL element 8, and it is possible to prevent variations in the light-emission luminance due to variations in the characteristics of the transistor TR2.

However, in the case of the configuration shown in FIG. 19, regarding one pixel 23, it is necessary to provide one signal line SIG, four scanning lines responsive to control signals AZ2 and AZ1 , a driving pulse signal DS, and a writing signal WS, and four wiring patterns of fixed potentials Vcc, Vofs, Vss, and Vcat. Here, the electrode of the fixed potential Vcat is formed on the entire panel by vapor deposition. Therefore, even if scanning lines are used in common at red, blue, and green pixels, wiring patterns of four scanning lines and 3×3 wiring patterns of fixed potentials become necessary with respect to one set of red, blue, and green pixels.

As a result, in a display apparatus of the related art using N-channel transistors, there is a problem in that the number of scanning lines and the number of wiring patterns of fixed potentials become large. When the number of wiring patterns becomes large, it is difficult to efficiently arrange pixels at a high density, and it is difficult to manufacture a high-definition display apparatus with a high yield.

SUMMARY OF THE INVENTION

The present invention has been made in view of the above points. It is desirable to provide a display apparatus capable of reducing the number of scanning lines and the number of wiring patterns of fixed potentials when compared to a known case.

According to an embodiment of the present invention, there is provided a display apparatus including: a pixel unit in which pixels are arranged in a matrix pattern; and a driving circuit for driving the pixel unit. Each of the pixels includes a signal level holding capacitor and a first transistor that is turned on/off in response to a writing signal, through which one end of the signal level holding capacitor is connected to a signal line. A second transistor having one end of the signal level holding capacitor connected to a gate thereof, and the other end of the signal level holding capacitor connected to a source thereof. A current-driven self-light-emitting element whose cathode is held at a cathode potential and its anode connected to the source of the second transistor. A third transistor is turned on/off in response to a driving pulse signal, through which the drain of the second transistor is connected to a power-supply voltage. A fourth transistor is turned on/off in response to a control signal, and sets the other end of the signal level holding capacitor to a first fixed potential. The driving circuit outputs the writing signal, the driving pulse signal, and the control signal, sequentially setting the signal level of the signal line to a signal level corresponding to the gray-scale level of each pixel connected to the signal line, with the period of a second fixed potential in between, sequentially repeating cyclical settings of the first to fifth periods and drives the pixel unit. In the first period, the first and fourth transistors are set to an off state, and the third transistor is set to an on state in response to the writing signal, the driving pulse signal, and the control signal, driving the self-light-emitting element by using the second transistor on the basis of an electric current value in accordance with a gate-source voltage resulting from a potential across the ends of the signal level holding capacitor, so as to cause the self-light-emitting element to emit light. The second period sets the third transistor to an off state so as to cause the self-light-emitting element to stop light emission in response to the driving pulse signal The third period sets the fourth transistor to an on state in response to the control signal in order to set the other end of the signal level holding capacitor to the first fixed potential, setting the first transistor to an on state in response to the writing signal, and sets one end of the signal level holding capacitor to the second fixed potential. The fourth period, during the period of time in which the second fixed potential is repeated a plurality of times in the signal line, the first fourth transistors are set to an on state and an off state in response to the writing signal and the control signal, respectively During the period of time in which the signal level of the signal line is set to the second fixed potential, the third transistor is set to an on state in response to the driving pulse signal so as to set the potential difference across the ends of the signal level holding capacitor to a voltage approximately equal to a threshold voltage of the second transistor. In the fifth period, in response to the writing signal, the first transistor is set from an on state to an off state, and sets the signal level of the signal line in one end of the signal level holding capacitor.

According to the configuration of the embodiment of the present invention, the gate voltage of the second transistor for driving a self-light-emitting element is set to a fixed potential, and variations in the light-emission luminance due to variations in the threshold voltage of the second transistor are corrected, making it possible to supply the fixed potential from the signal line side. As a result, it is possible to omit wiring patterns for separately supplying a fixed potential and scanning lines of a control signal for controlling the setting of the fixed potential to the second transistor. As a result, it is possible to reduce the number of scanning lines and the number of wiring patterns for fixed potentials in comparison with a known case.

According to the embodiment of the present invention, it is possible to reduce the number of scanning lines and the number of wiring patterns of fixed potentials in comparison with a known case.

DESCRIPTION OF THE PREFERRED EMBODIMENTS

Embodiments of the present invention will be described in detail below.

First Embodiment

Figure 1:
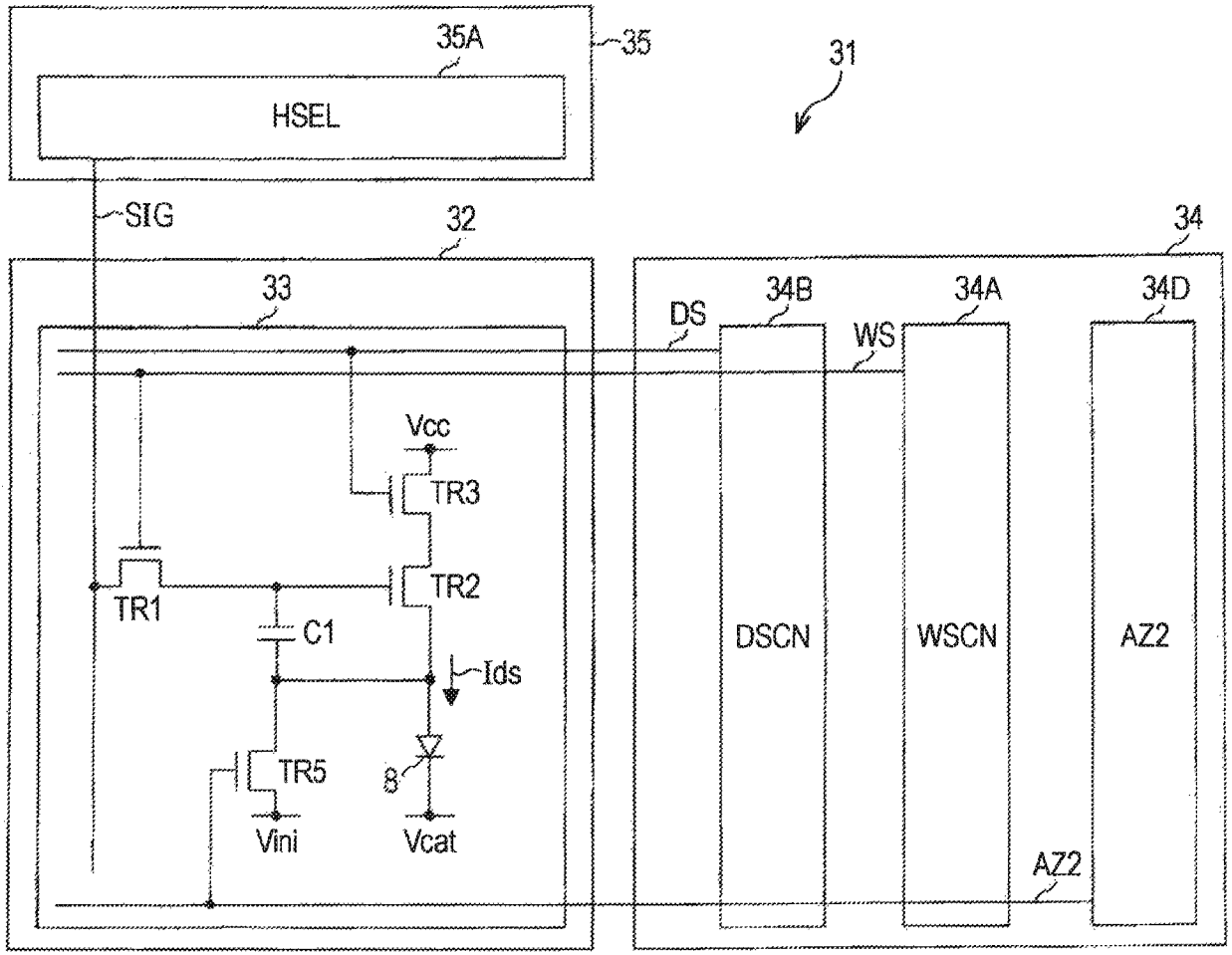
FIG. 1 is a block diagram allowing a display apparatus according to a first embodiment of the present invention.
Figure 15:
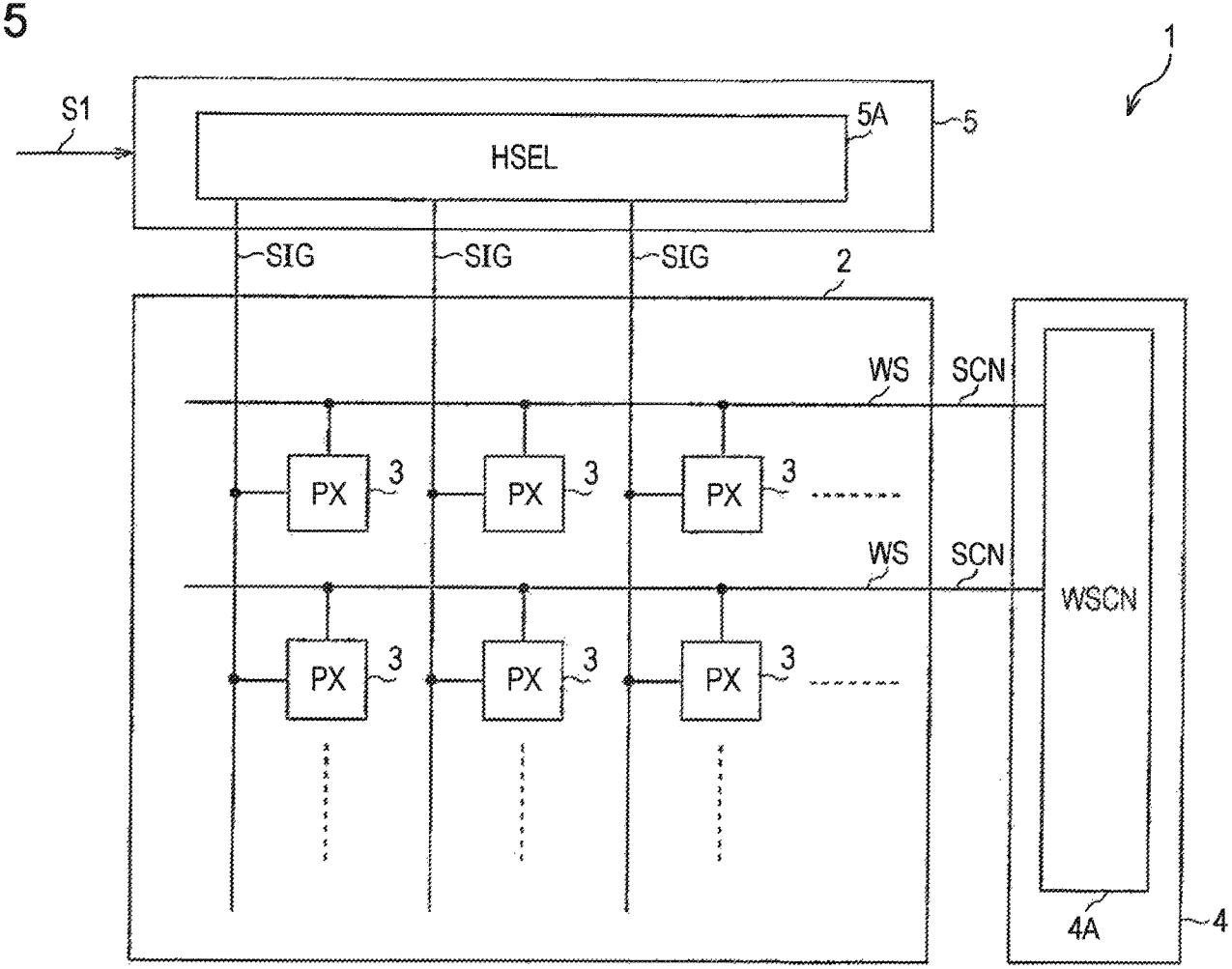
FIG. 15 is a block diagram showing a display apparatus of the related art.
Figure 16:
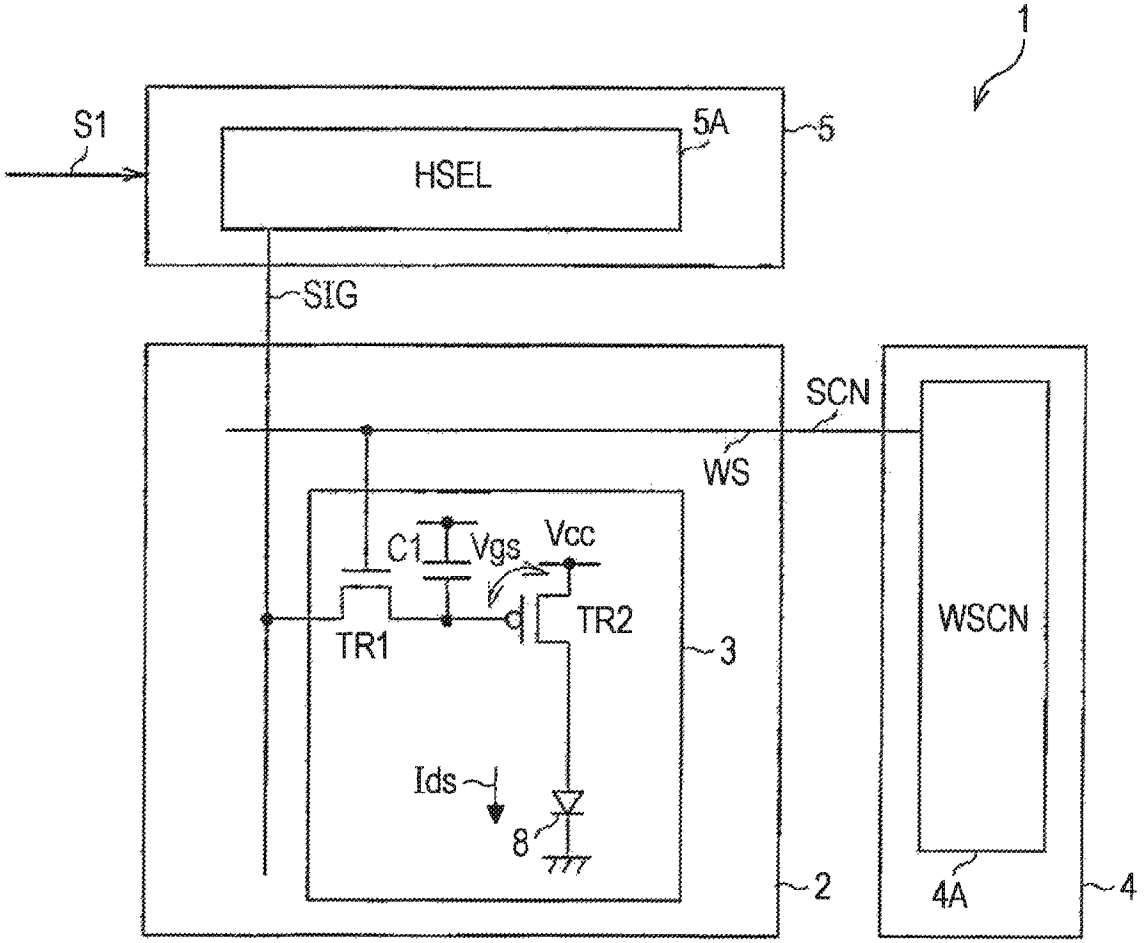
FIG. 16 is a block diagram showing in detail the display apparatus shown in FIG. 15.
Figure 17:
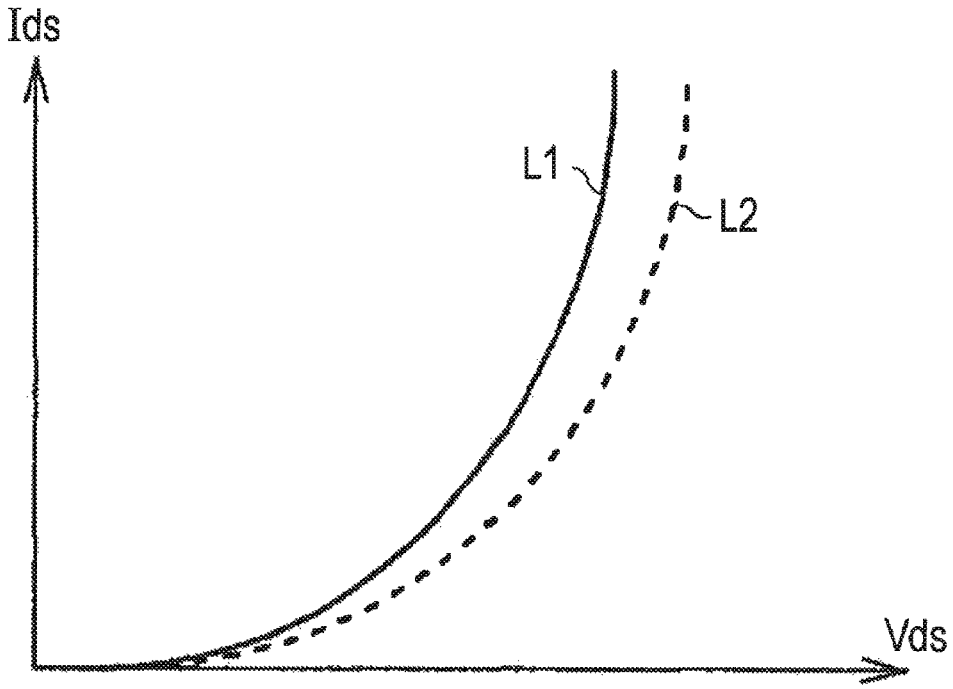
FIG. 17 is a characteristic curve diagram showing changes over time of an organic EL element.
Figure 18:
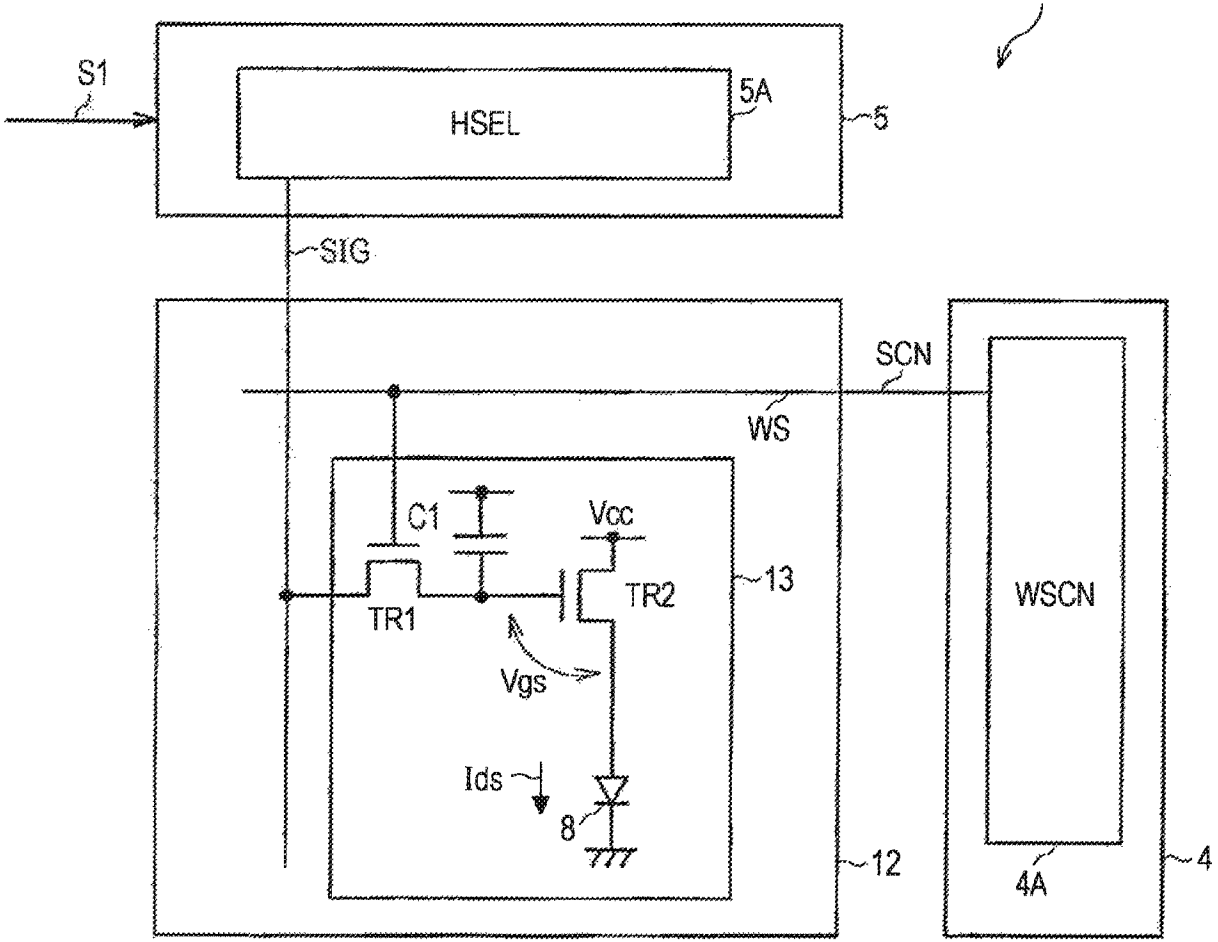
FIG. 18 is a block diagram showing a case in which N-channel transistors are used in the configuration shown in FIG. 15.
Figure 19:
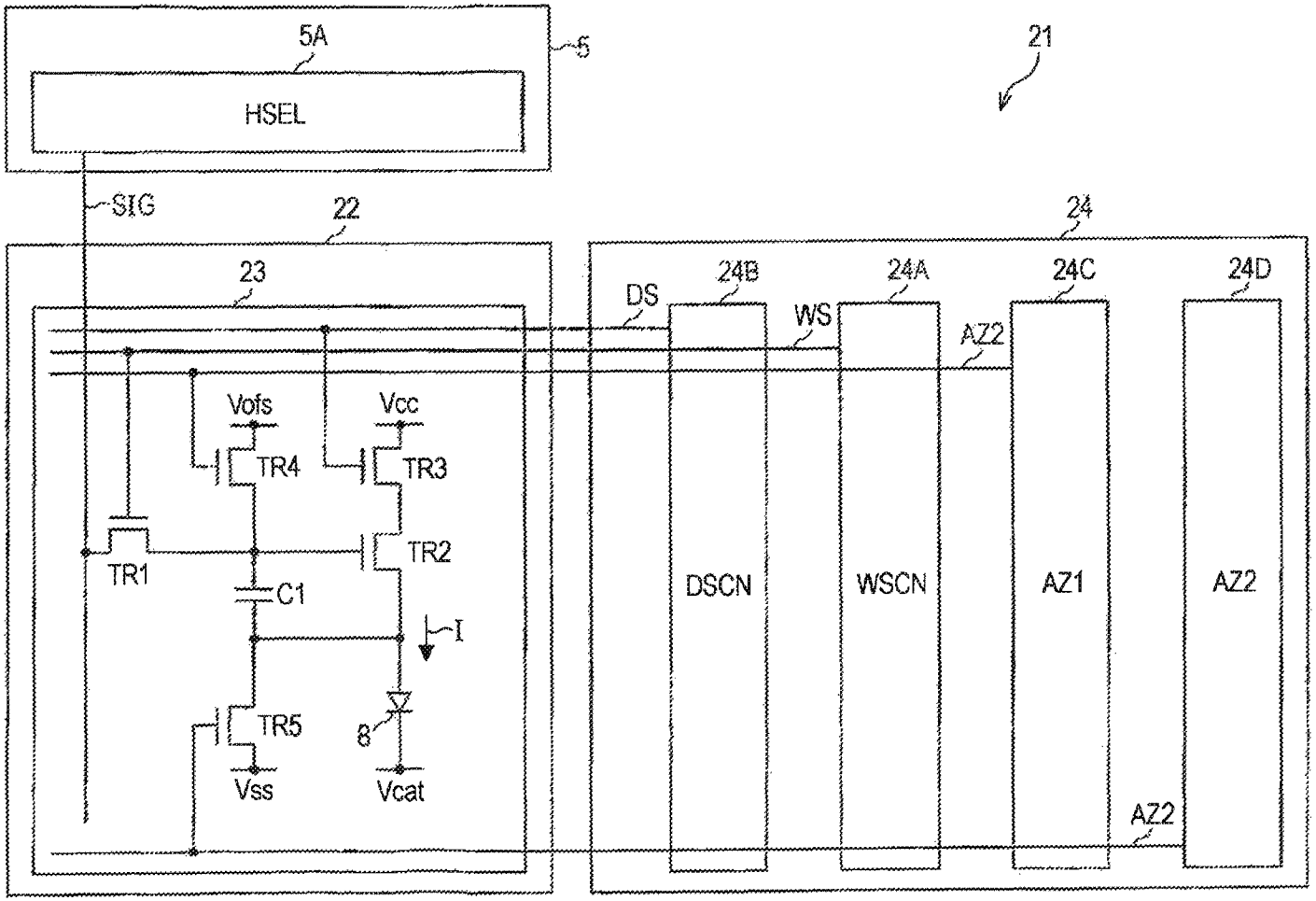
FIG. 19 is a block diagram showing a display apparatus of the related art in which N-channel transistors are used.
Figure 20:
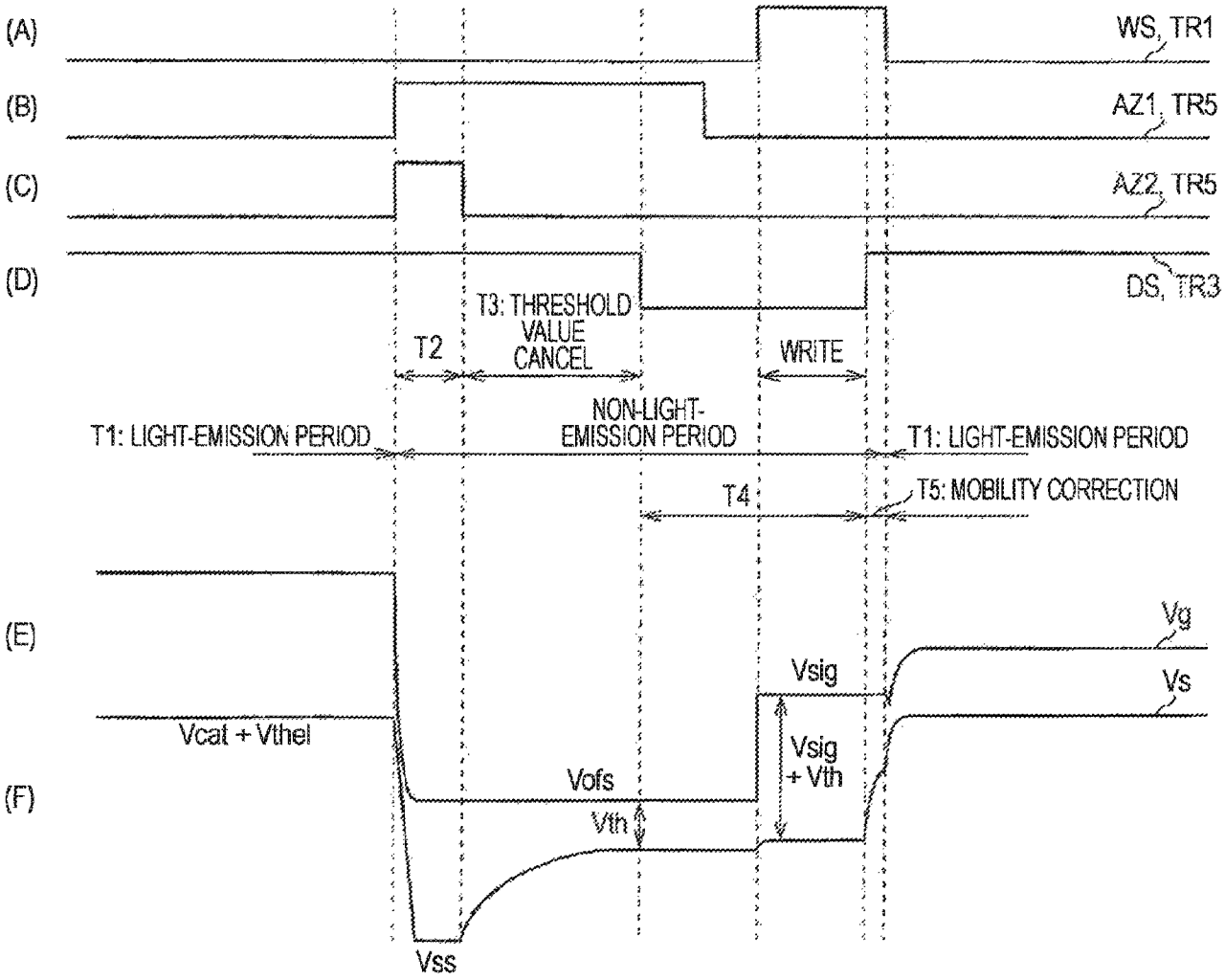
FIG. 20 is a timing chart of the display apparatus shown in FIG. 19.
Figure 21:
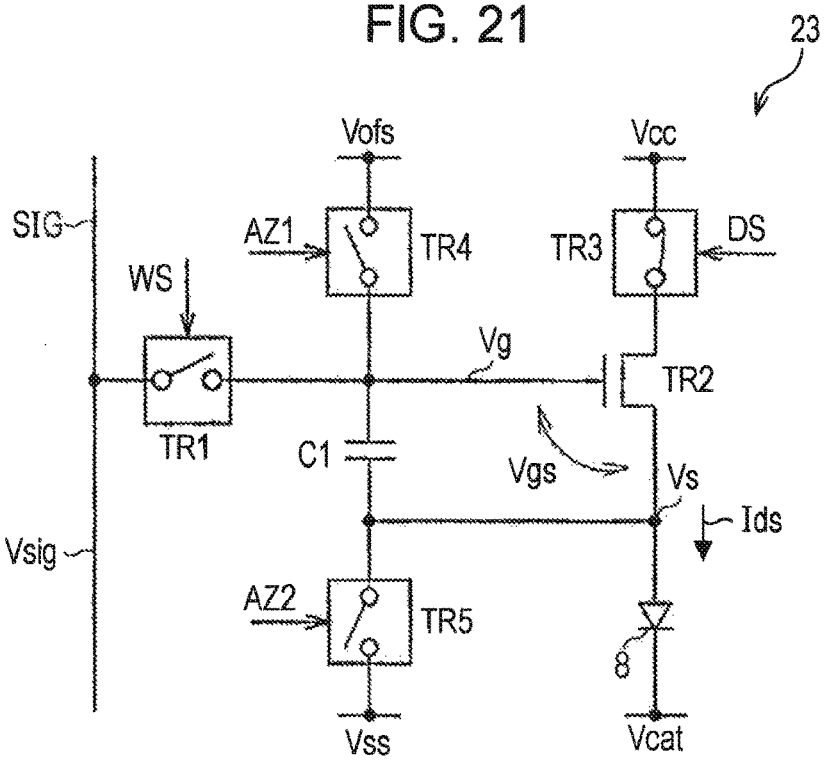
FIG. 21 is a connection diagram showing the setting of a pixel during a period T1 in FIG. 20.
Figure 22:
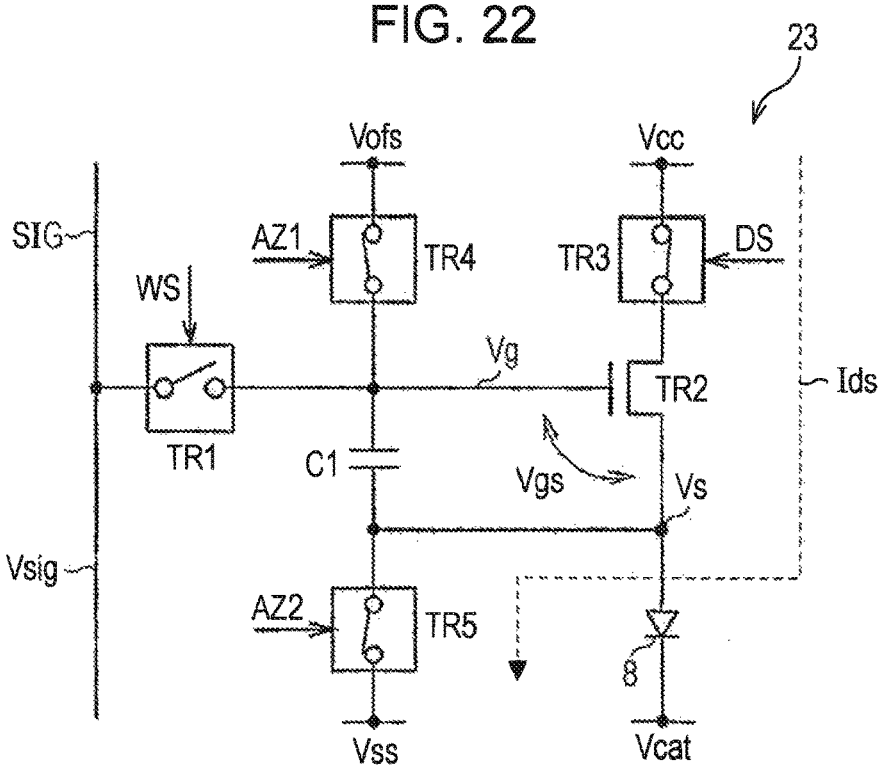
FIG. 22 is a connection diagram showing the setting of a pixel during a period T2 in FIG. 20.
Figure 23:
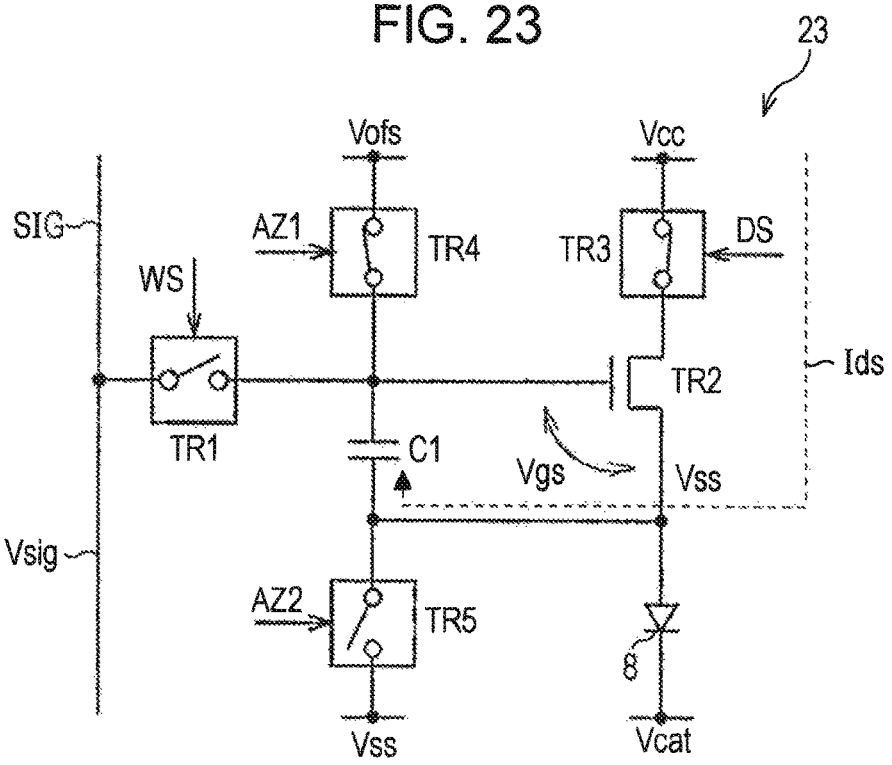
FIG. 23 is a connection diagram showing the setting of a pixel during a period T3 in FIG. 20.
Figure 24:
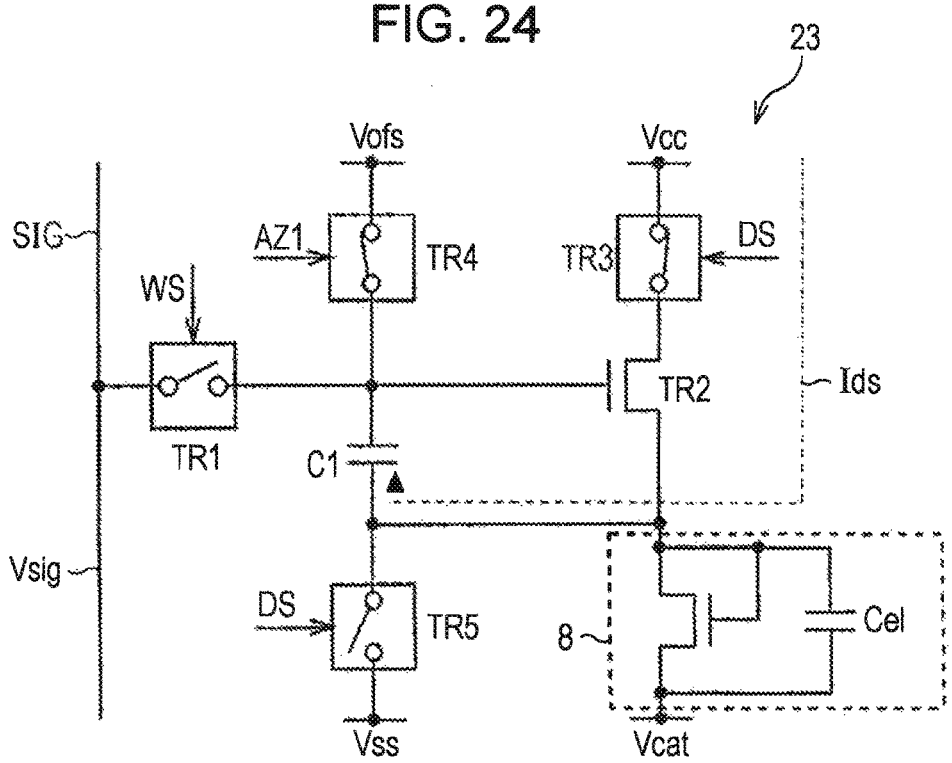
FIG. 24 is a connection diagram showing the continuation of FIG. 23.
Figure 25:
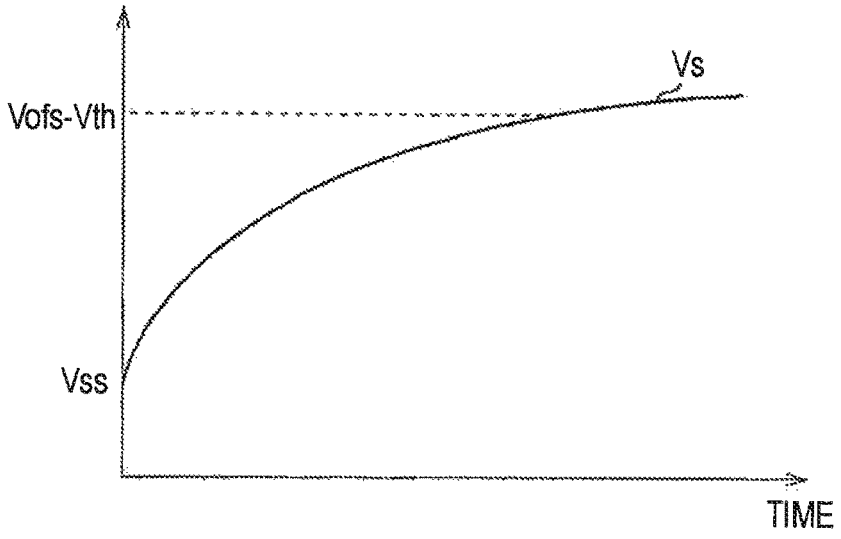
FIG. 25 is a characteristic curve diagram illustrating the correction of a threshold voltage.
Figure 26:
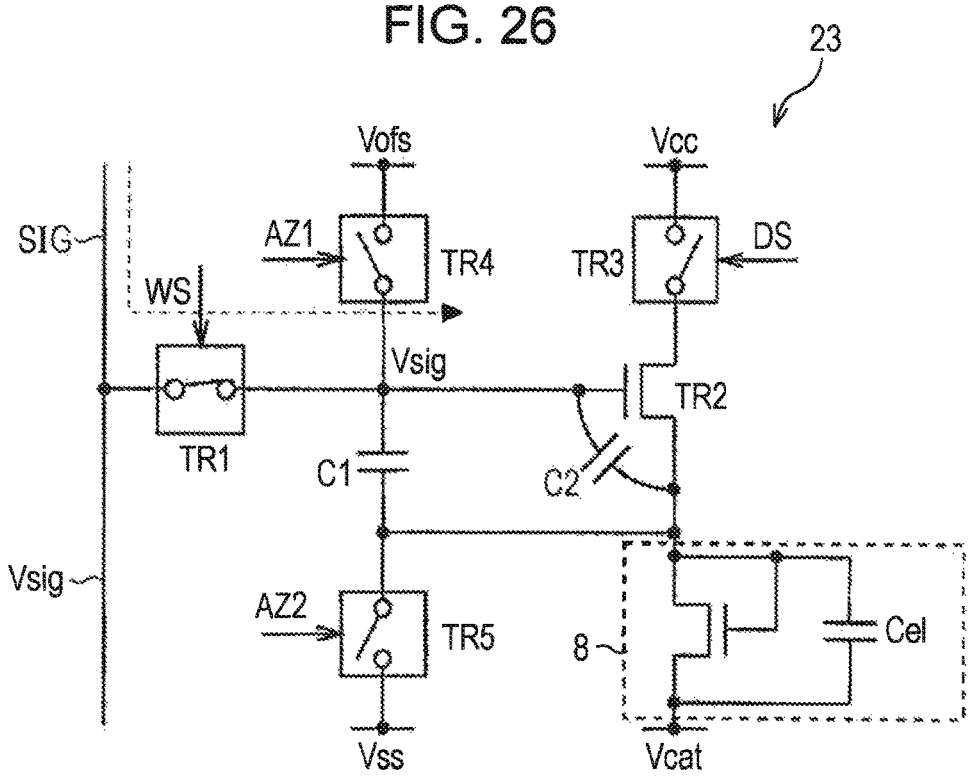
FIG. 26 is a connection diagram showing the setting of a pixel during a period T4 in FIG. 20.
Figure 27:
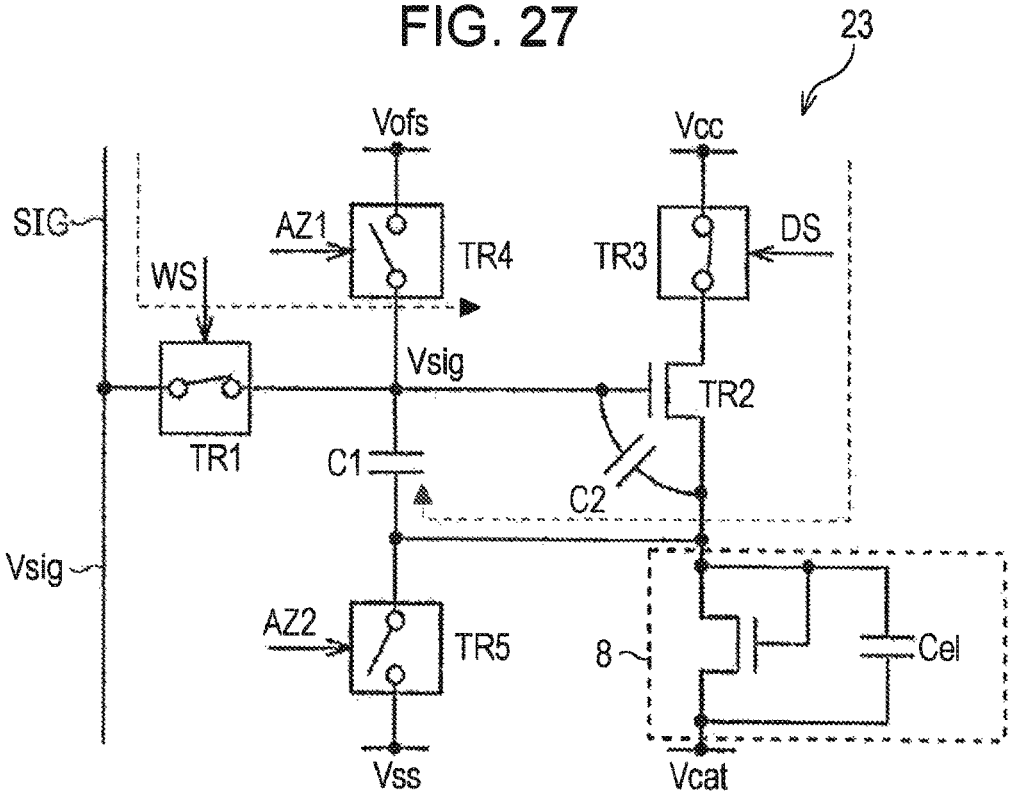
FIG. 27 is a connection diagram showing the setting of a pixel during a period T5 in FIG. 20.
Figure 28:
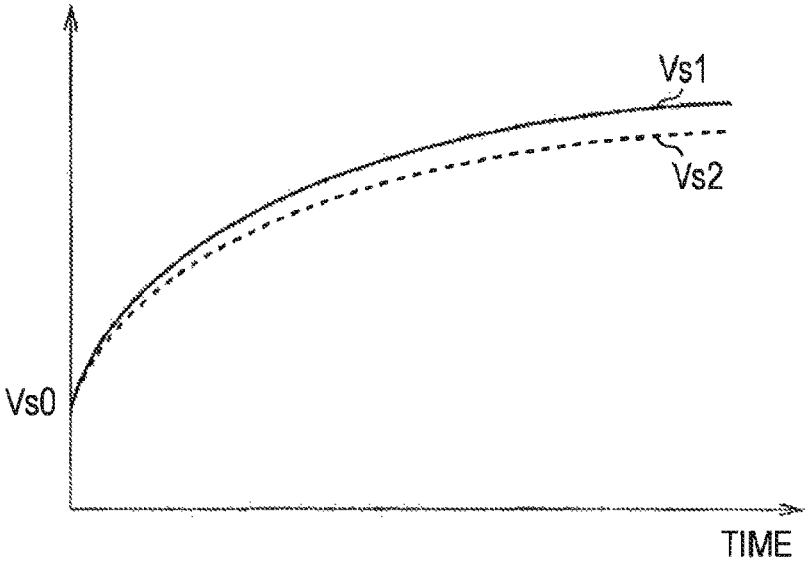
FIG. 28 is a characteristic curve diagram illustrating the correction of a mobility.

FIG. 1, in contrast with FIG. 19, is a block diagram showing a display apparatus according to a first embodiment of the present invention. In a display apparatus 31, components having the same configuration as those components of the display apparatuses 1, 11, and 21 described with reference to FIGS. 15, 19, and so on, are designated with the same reference numerals, thus duplicate descriptions thereof are omitted. All the transistors of the display apparatus 31 are formed by N-channel transistors, a pixel unit 32, a horizontal driving circuit 35, and a vertical driving circuit 34 on a glass substrate, which is a transparent insulating substrate with an amorphous silicon process.

Figure 2:
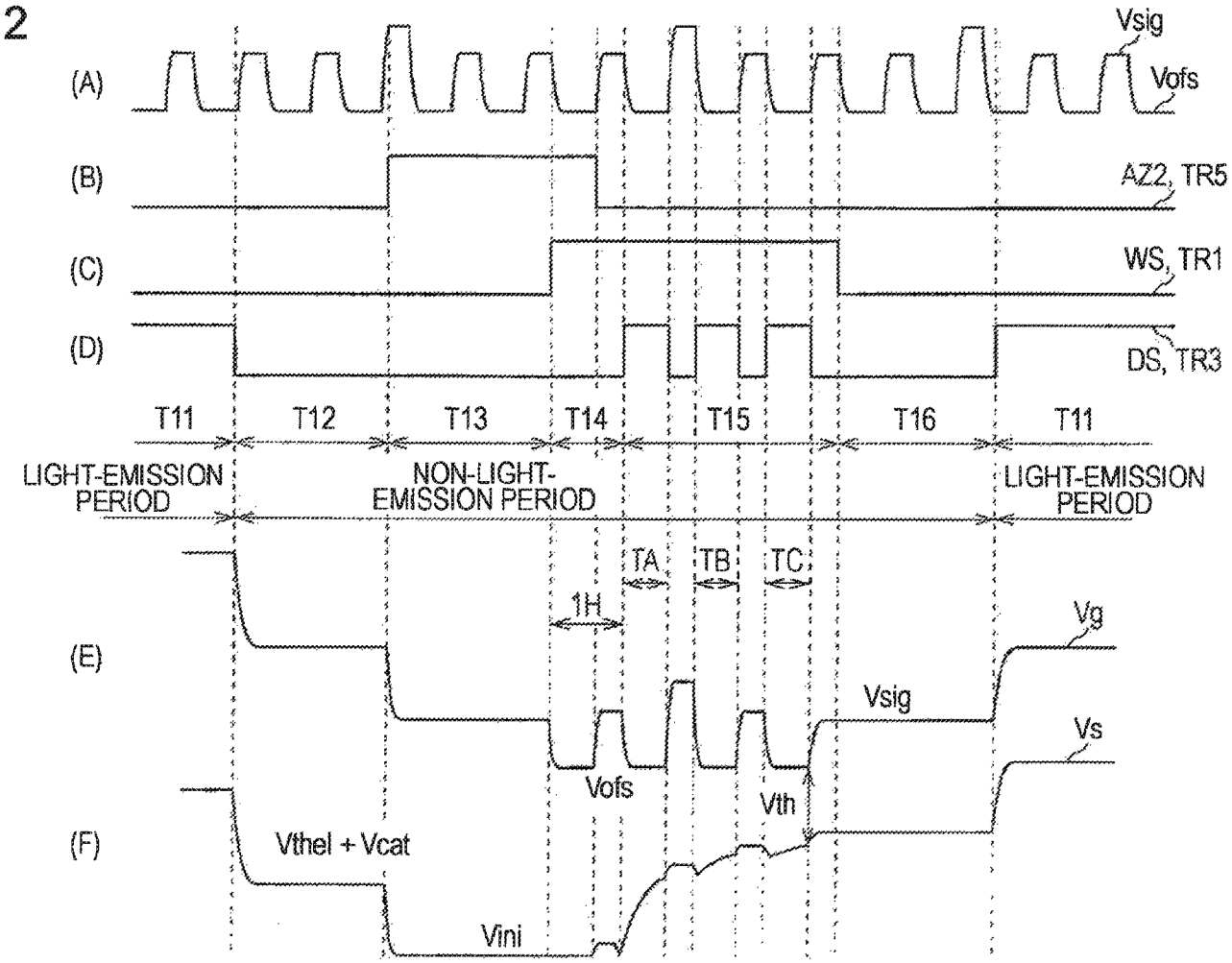
FIG. 2 is a timing chart of the display apparatus shown in FIG. 1.

Here, the horizontal driving circuit 35 sequentially transfers a predetermined sampling pulse in accordance with a clock by using a horizontal selector (HSEL) 35A in order to generate a timing signal, and sets each signal line SIG to a signal level of an input signal S1 by using the timing signal as a reference. At this time, as shown in FIG. 2, during an approximately first half period of one horizontal scanning period (1H), the signal level of the signal line SIG is set to a predetermined fixed potential Vofs in the pixel 23, described with reference to FIG. 19. During approximately the second half of one horizontal scanning period, the signal level of the signal line SIG is sequentially set to a signal level Vsig corresponding to the gray-scale level of a pixel 33 connected to each signal line SIG (part (A) of FIG. 2). In FIG. 2, a reference character of a transistor that is turned on/off in accordance with a corresponding signal is shown for each signal.

In association with the configuration of the horizontal driving circuit 35, a control signal generation circuit (AZ2) in the vertical driving circuit 34 for outputting a control signal AZ2 related to the control of the fixed potential Vofs is omitted. A write scanning circuit (WSCN) 34A, a drive scanning circuit (DSCN) 34B, and a control signal generation circuit 34D generate a writing signal WS, a driving pulse signal DS, and a control signal AZ2, respectively.

The pixel unit 32 is formed in such a manner that pixels 33 are arranged in a matrix pattern. In the pixel 33, one end of the signal level holding capacitor C1 is connected to the anode of the organic EL element 8, and the other end of the signal level holding capacitor C1 is connected to the signal line SIG via the transistor TR1 that is turned on/off in accordance with the writing signal WS. As a result, in the pixel 33, the voltage at the other end of the signal level holding capacitor C1 is set to the signal level of the signal line SIG in accordance with the writing signal WS.

In the pixel 33, one end of the signal level holding capacitor C1 is connected to the source and the other end thereof is connected to the gate of the transistor TR2, and the drain of the transistor TR2 is connected to a power supply Vcc via a transistor TR3 that is turned on/off in accordance with the driving pulse signal DS. As a result, in the pixel 33, the transistor TR2 drives the organic EL element 8 of a source follower circuit in which the gate potential is set to the signal level of the signal line SIG.

Furthermore, in the pixel 33, the terminal voltage of the signal level holding capacitor C1 on the organic EL element 8 side is connected to a fixed potential Vini via a transistor TR5 that is turned on/off in accordance with a control signal AZ2.

Figure 3:
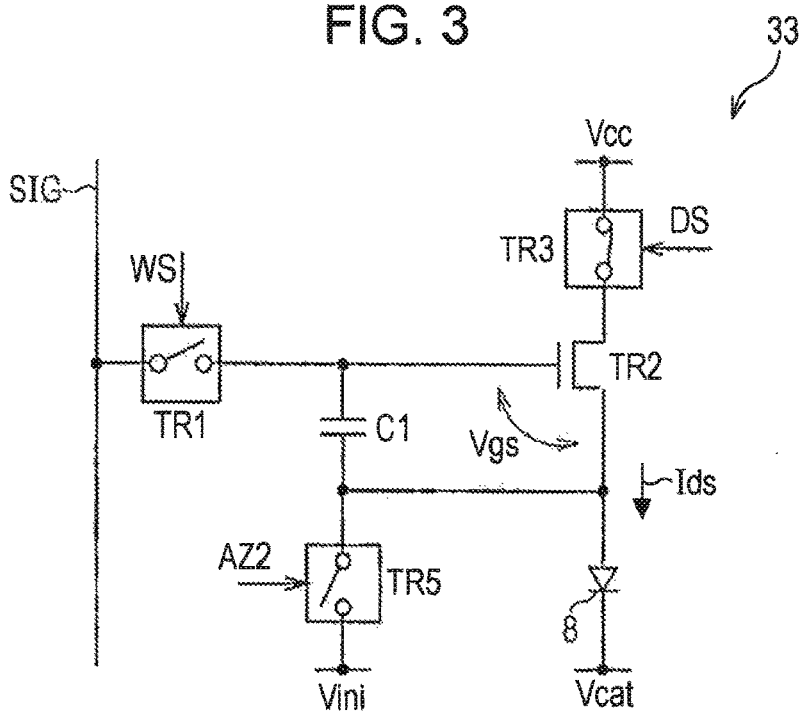
FIG. 3 is a connection diagram showing the setting of a pixel during a period T11 in FIG. 2.

As shown in FIG. 3, during a light-emission period T11 in which the organic EL element 8 emits light, in the pixel 33, the signal levels of the writing signal WS and the control signal AZ2 (parts (B) and (C) of FIG. 2) are made to fall, so that the transistors TR1 and TR5 are set to an off state. Furthermore, the signal level of the driving pulse signal DS (part (D) of FIG. 2) is made to rise, so that the transistor TR3 is set to an on state. In this state, the pixel 33 has been set so that the transistor TR2 operates in a saturated area.

As a result, in the pixel 33, a constant current circuit that varies with a gate-source voltage Vgs resulting from by the potential difference across the ends of the signal level holding capacitor C1 is formed by the transistor TR2 and the signal level holding capacitor C1, and the organic EL element 8 is made to emit light in accordance with a drain-source current Ids determined by the gate-source voltage Vgs. As a result, in the display apparatus 31, a decrease in the luminance due to changes over time of the organic EL element 8 is prevented. Here, the drain-source current Ids is represented by equation (1).

Figure 4:
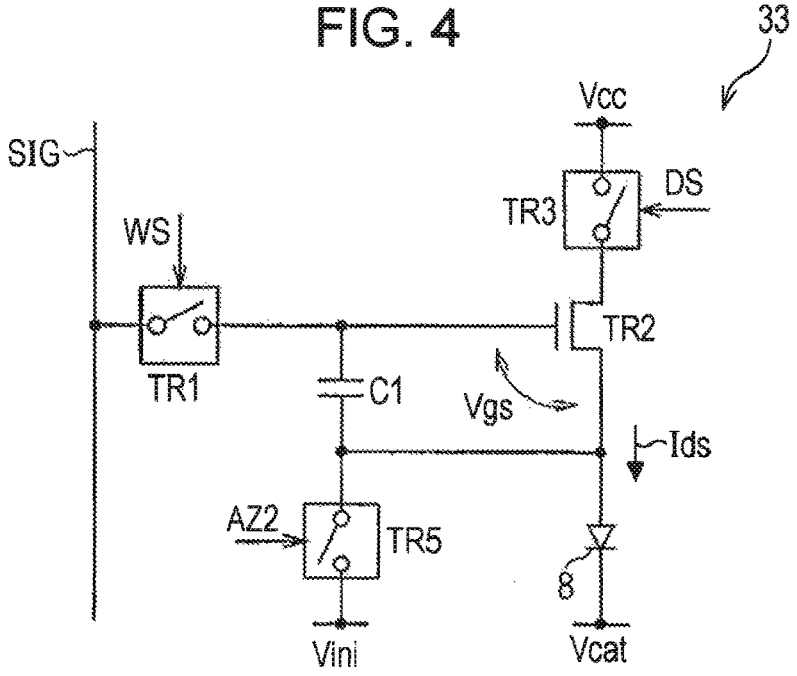
FIG. 4 is a connection diagram showing the setting of a pixel during a period T12 in FIG. 2.

In the pixel 33, when the light-emission period T11 ends, in the subsequent fixed period T12, the signal level of the driving pulse signal DS is made to fall, and as a result, the transistor TR3 is set to an off state, as shown in FIG. 4. As a result, during the period T12, the supply of the power from the power supply Vcc to the transistor TR2 is stopped, and the organic EL element 8 stops light emission. The source voltage Vs of the transistor TR2 is made to fall to a voltage Vcat+Vthel such that the threshold voltage Vthel of the organic EL element 8 is added to the cathode potential Vcat of the organic EL element 8.

Figure 5:
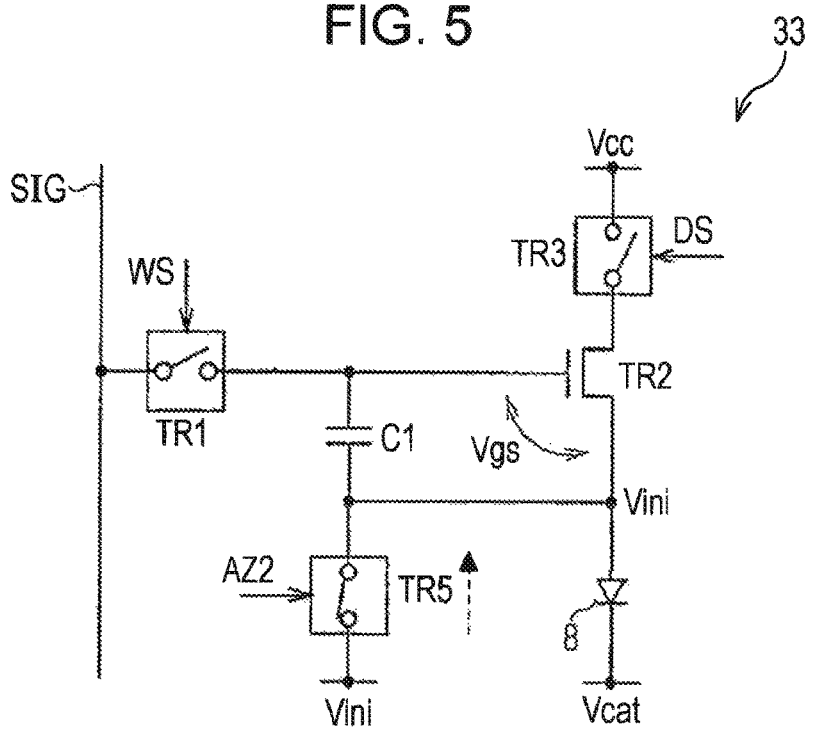
FIG. 5 is a connection diagram showing the setting of a pixel during a period T13 in FIG. 2.

In the pixel 33, during the subsequent period T13, the control signal AZ2 is made to rise and, as shown in FIG. 5, the transistor TR5 is set to an on state. As a result, in the pixel 33, the terminal voltage of the signal level holding capacitor C1 on the transistor TR5 side is set to the fixed potential Vini. Here, the fixed potential Vini is set in such a manner that the relation Vini≤Vthel+Vcat holds between the cathode potential Vcat of organic EL element 8 and the threshold voltage Vthel of the organic, EL element 8. As a result, during the period T13, the fixed potential Vini is set so that the organic EL element 8 stops light emission.

Figure 6:
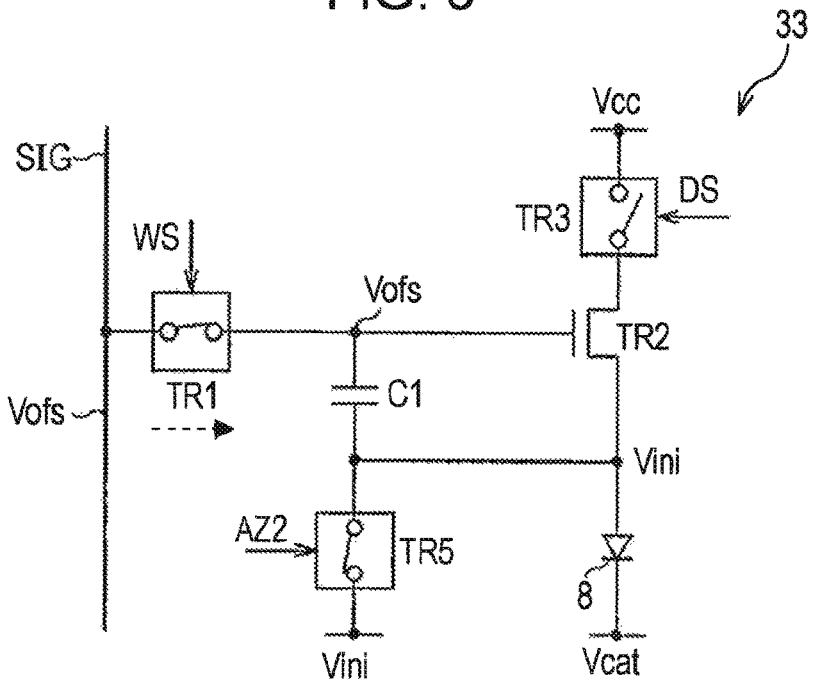
FIG. 6 is a connection diagram showing the setting of a pixel during a period T14 in FIG. 2.

In the pixel 33, during the subsequent period T14, the writing signal WS is made to rise during the period of time in which the signal level of the signal line SIG is set to the potential Vofs and, as shown in FIG. 6, the transistor TR1 is set to an on state. As a result, in the pixel 33, the terminal voltage of the signal level holding capacitor C1 on the transistor TR2 side is set to the signal level Vofs of the signal line SIG.

Figure 7:
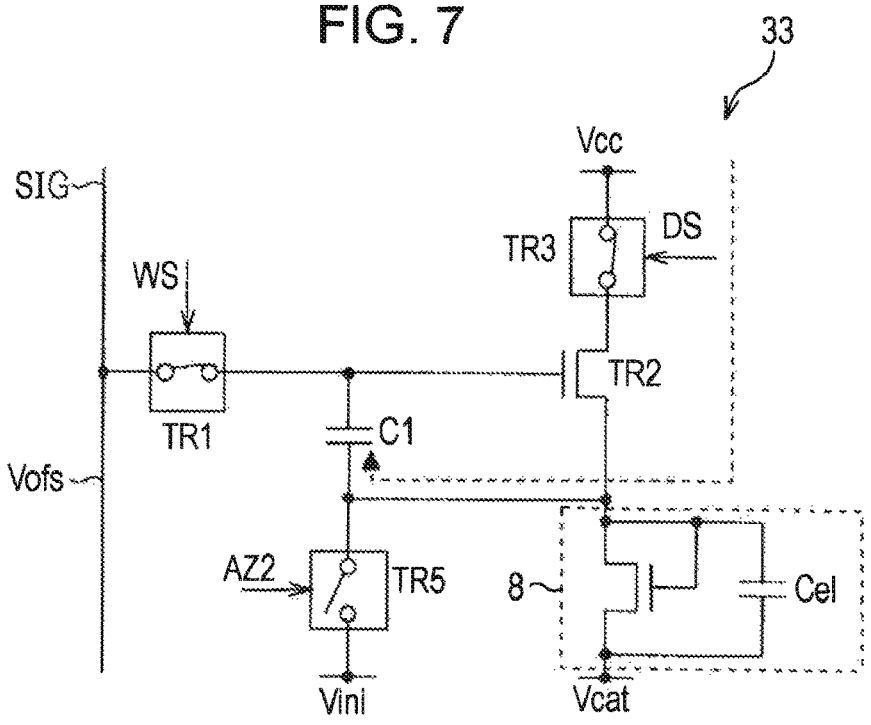
FIG. 7 is a connection diagram showing the subsequent setting in FIG. 6.

Next, in the pixel 33, during the period T15, the signal level of the control signal AZ2 is made to fall, so that the transistor TR5 is set to an off state. During the time from when the writing signal WS is made to rise to set the transistor TR1 to an on state until the transistor TR5 is set to an off state, the above is performed during the period of time in which the signal level of the signal line SIG has been set to the potential Vofs. Next, in the pixel 33, at the timing at which the period of time in which the signal level of the signal line SIG has been set to the fixed potential Vofs starts, which is a timing preceding by a predetermined number of horizontal scanning periods from the time at which the light-emission period T11 starts, the driving pulse signal DS is made to rise and, as shown in FIG. 7, the transistor TR3 is set to an on state. As a result, in the pixel 33, the source voltage Vs of the transistor TR2 increases gradually such that the potential difference across the ends of the signal level holding capacitor C1 becomes a threshold voltage Vth of the transistor TR2.

In the state shown in FIG. 7, the pixel 33 is held at Vel≤Vcat+Vthel and is set to a voltage at which a very small electric current compared with the drain-source current Ids of the transistor TR2 flows. Therefore, the drain-source current. Ids of the transistor TR2 is used to charge the signal level holding capacitor C1 and the capacitance of the organic EL element 8, and the organic EL element 8 is held in a state in which light emission is stopped.

Figure 8:
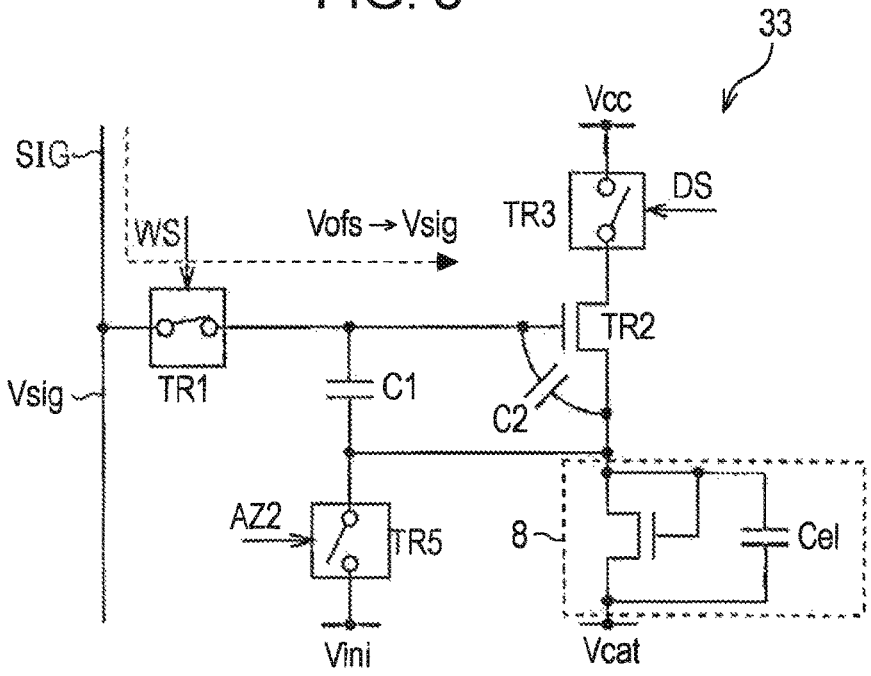
FIG. 8 is a connection diagram showing the subsequent setting in FIG. 7.

Next, in the pixel 33, at the timing at which the signal level of the signal line SIG rises to the signal level Vsig corresponding to the gray-scale level, the signal level of the driving pulse signal DS is made to fall. As a result, as shown in FIG. 8, the transistor TR3 is set to an off state, and the gate voltage Vg of the transistor TR2 rises from the voltage Vofs to the signal level Vsig corresponding to the gray-scale level of the pixel preceding by a predetermined number of lines. Also, in this case, the pixel 33 is held at Vel≤Vcat+Vthel, and the organic EL element 8 is held in a state in which light emission is stopped. Changes in the source voltage Vs of the transistor TR2 at this time are represented by the following equation:

$$\Delta Vs=((C1+C2)/(Cel+C1+C2))\times(Vsig-Vofs) \quad (4)$$

After a fixed time has passed, the signal level of the signal line SIG is again set to the fixed potential Vofs and is input to the gate of the transistor TR2. In this case, changes in the source voltage Vg of the transistor TR2 are represented by the following equation:

$$\Delta Vs=((C1+C2)/(Cel+C1+C2))\times(Vofs-Vsig) \quad (5)$$

In the pixel 33, the state shown in FIG. 7 where the signal level of the driving pulse signal DS is made to rise, and the state shown in FIG. 8 where the signal level of the driving pulse signal DS is made to fall, are repeated a predetermined number of times. The source voltage Vs of the transistor TR2 is made to gradually rise, and the potential difference across the ends of the signal level holding capacitor C1 is set to the threshold voltage Vth of the transistor TR2. As a result, the anode potential Vel of the organic EL element 8 is set to Vel=Vofs−Vth≤Vcat+Vthel.

Figure 9:
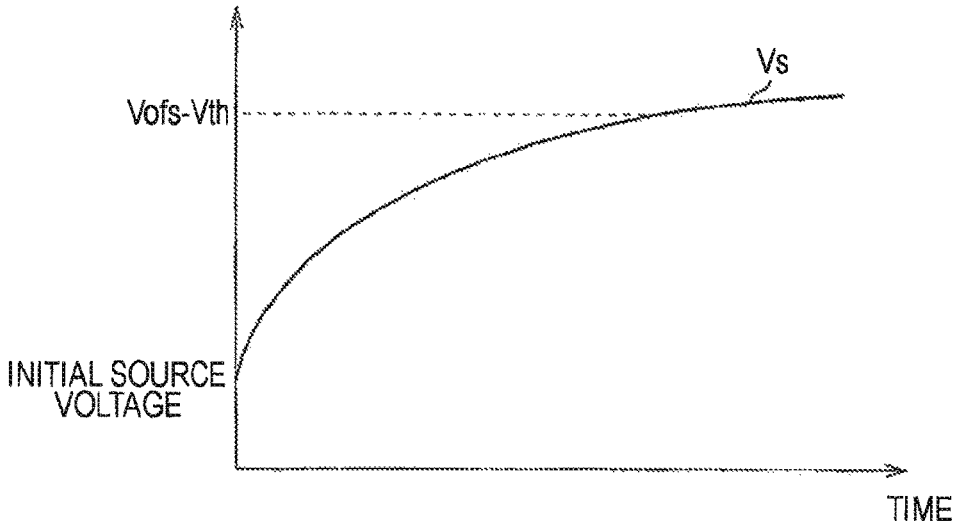
FIG. 9 is a characteristic curve diagram illustrating the correction of a threshold voltage.

As a result, in the example shown in FIG. 2, during periods TA, TB, and TC, the potential difference across the ends of the signal level holding capacitor C1 is set to the threshold voltage Vth of the transistor TR2. FIG. 9 is a characteristic curve diagram showing changes in the source voltage Vs of the transistor TR2 when the signal level of the signal line SIG is held at the fixed potential Vofs for a long time. Eventually, the gate-source voltage Vgs of the transistor TR2 becomes a voltage Vth. As a result, the display apparatus 31 is set so that the states shown in FIGS. 7 and 8 are repeated a sufficient number of times to set the potential difference across the ends of the signal level holding capacitor C1 to the threshold voltage Vth of the transistor TR2.

Figure 10:
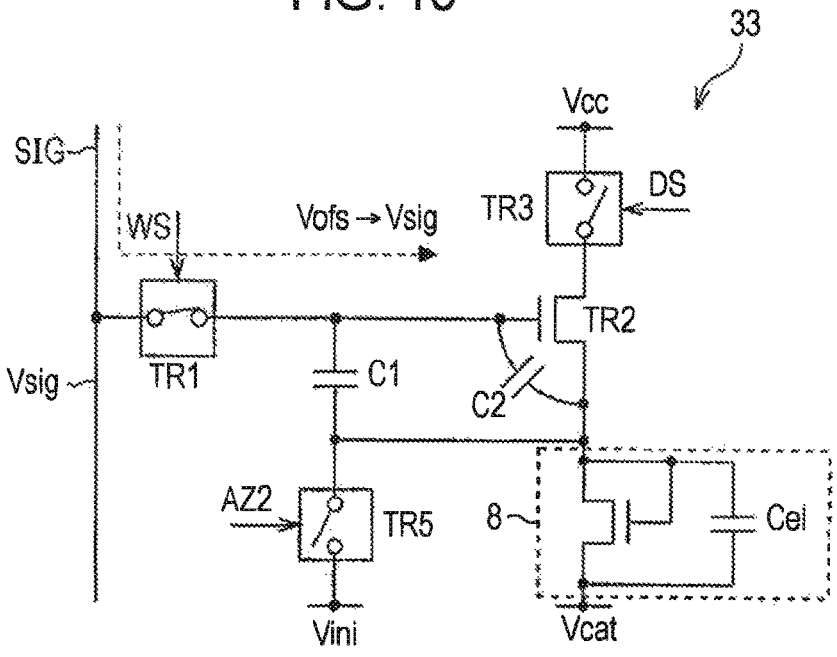
FIG. 10 is a connection diagram showing the setting of a pixel during a period T15 in FIG. 2.

In the manner described above, in the pixel 33, when the threshold voltage Vth of the transistor TR2 is set in the signal level holding capacitor C1, in the subsequent period T16, the signal level of the writing signal WS is made to fall during the period of time in which the signal level of the signal line SIG has been set to the signal level Vsig of the corresponding pixel. As a result, as shown in FIG. 10, the signal level of the signal line SIG when the transistor TR1 has been set to an on state just before is sampled and held by the signal level holding capacitor C1.

Also, in this case, although the gate-source voltage Vgs of the transistor TR2 is, to be accurate, represented by equation (2), the gate-source voltage is set to the voltage Vsig+Vth with sufficient accuracy for practical use if the parasitic capacitance Cel of the organic EL element 8 is greater than the capacitance of the signal level holding capacitor C1 and the gate-source capacitance C2 of the transistor TR2.

Furthermore, next, the signal level of the driving pulse signal DS is made to rise and, as shown in FIG. 3, the light-emission period T11 is restarted.

Figure 11:
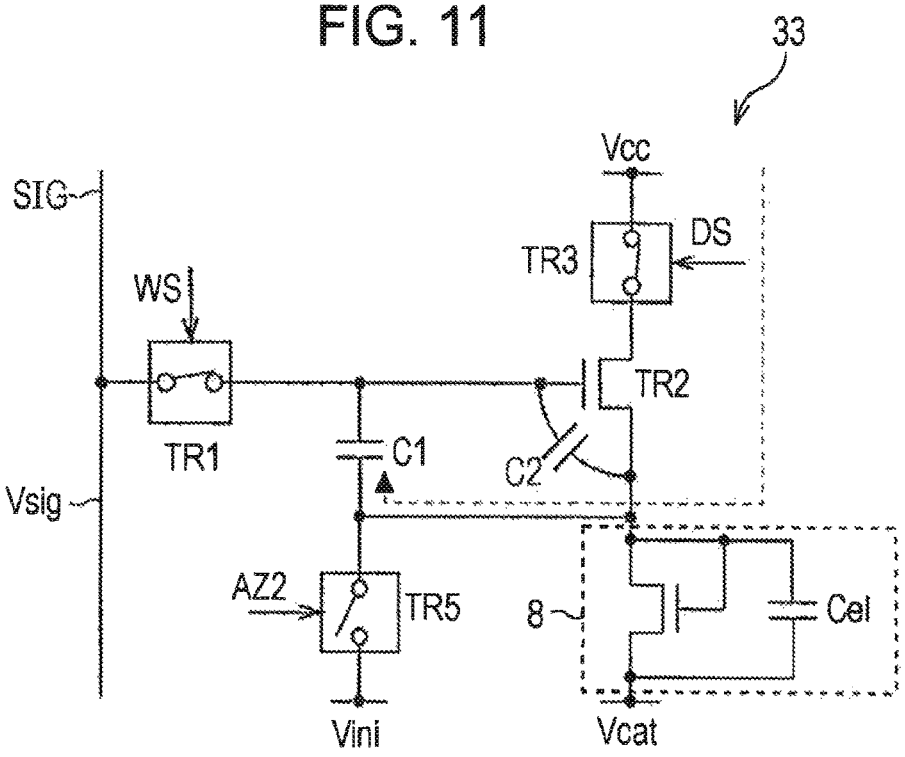
FIG. 11 is a connection diagram showing the subsequent setting in FIG. 10.

Here, during the period T15, the driving pulse signal DS is made to rise before the writing signal WS is made to fall so that, as shown in FIG. 11, during the period of time in which the signal level of the signal line SIG has been set to the signal level corresponding to the gray-scale level of the pixel, both the transistors TR1 and TR2 are set to an on state, and variations in the mobility of the transistor TR2 are corrected.

Figure 12:
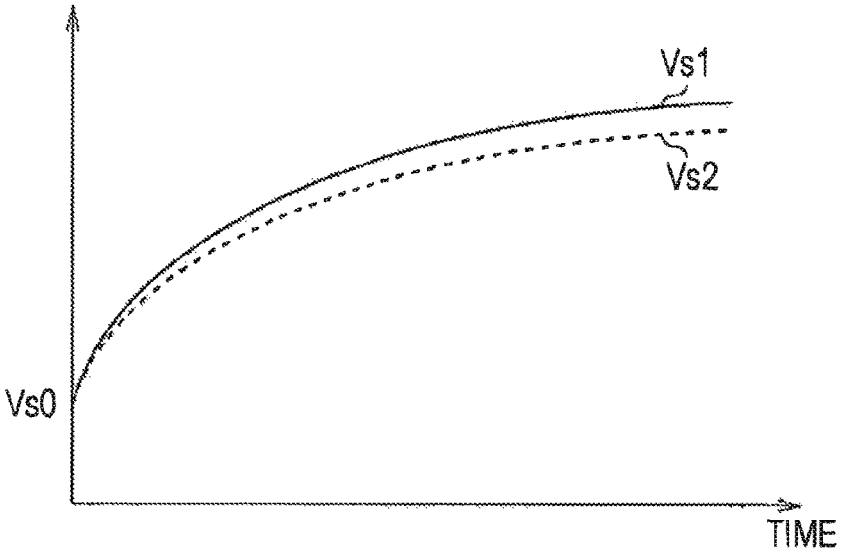
FIG. 12 is a characteristic curve diagram illustrating the correction of a mobility.

That is, in the state shown in FIG. 11, the source voltage Vs (Vs1, Vs2) of the transistor TR2 changes in accordance with the mobility of the transistor TR2, as shown in FIG. 12. As a result, variations in the mobility of the transistor TR2 are corrected. In FIG. 12, Vs1 and Vs2 indicate a case in which the mobility is large and a case in which the mobility is small, respectively.

Operation of the Embodiment

In the above configuration, in the display apparatus 31 (FIG. 2), as a result of driving the scanning lines by the vertical driving circuit 34, the signal levels of the signal lines SIG are set in the pixels 33 of the pixel unit 32 in sequence in units of lines. Also, each pixel 33 emits light in accordance with the set signal level, and a desired image is displayed by the pixel unit 32.

That is, in the display apparatus 31, the transistor TR1 is set to an on state and, as a result, the signal level of the signal line SIG is set in the signal level holding capacitor C1. Furthermore, the transistors TR1 and TR5 are set to an off state, and also the transistor TR3 is set to an on state, so that the transistor TR2 causes the organic EL element 8 to emit light on the basis of the voltage set in the signal level holding capacitor C1 (FIG. 2, the period T11).

In the display apparatus 31, one end of the signal level holding capacitor C1 is connected to the gate and the other end thereof is connected to the source of the transistor TR2 for driving the organic EL element 8, and the source of the transistor TR2 is connected to the anode of the organic EL element 8, thereby forming the pixel 33. As a result, in the display apparatus 31, after the signal level of the signal line SIG is set in the signal level holding capacitor C1, the organic EL element 8 is driven on the basis of the gate-source voltage Vgs resulting from the potential difference across the ends of the signal level holding capacitor C1. Even when all the transistors constituting the display apparatus 31 are formed by N-channel transistors, it is possible to prevent a decrease in the light-emission luminance due to changes over time of the organic EL element 8.

In comparison, when the light emission of the organic EL element 8 is to be stopped and the signal level of the signal line SIG is to be set in the signal level holding capacitor C1, under the on/off control of the transistors TR1, TR3, and TR5, the source voltage Vs and the gate voltage Vg of the transistor TR2 for driving the organic EL element 8 are temporarily set to the fixed potentials Vss and Vofs, respectively. Thereafter, the source voltage Vs is made to rise gradually, and the potential difference across the ends of the signal level holding capacitor C1 is set to the threshold voltage Vth of the transistor TR2 (periods TA, TB, and TC). Thereafter, the signal level Vsig of the signal line SIG is set in the signal level holding capacitor C1 and, as a result, variations in the light-emission luminance due to variations in the threshold voltage Vth, which is one of the characteristics of the transistor TR2, are prevented.

However, when fixed potentials Vss and Vofs are set in the gate and the source of the transistor TR2, respectively, three wiring patterns of fixed potentials including the power-supply voltage Vcc are necessary to set the threshold voltage Vth of the transistor TR2 in the signal level holding capacitor C1. The wiring pattern of the cathode voltage Vcat of the organic EL element 8 is excluded (FIG. 19). Furthermore, the number of scanning lines becomes large.

Therefore, in the display apparatus 31, the signal levels of the signal lines are sequentially set to a signal level indicating the gray-scale level of each pixel with the fixed potential Vofs in between, and the writing signal WS and the driving pulse signal DS are set so as to correspond to the setting of the signal lines. As a result, when the threshold voltage Vth of the transistor TR2 is to be set in the signal level holding capacitor C1, the gate side of the transistor TR2 is set to the fixed potential Vofs via the signal line SIG.

As a result, in the display apparatus 31, a wiring pattern for a fixed potential Vofs to be supplied to the gate side of the transistor TR2 can be omitted, and the number of wiring patterns can be reduced in comparison with a known case. Furthermore, the transistor TR4 related to the fixed potential and the control signal AZ1 for controlling the on/off states of the transistor TR4 can be omitted. As a result, the number of scanning lines can be reduced, and furthermore the configuration of each pixel 33 can be simplified. As a result, in the display apparatus 31, it is possible to efficiently arrange pixels 33 at a high density and to provide a high-definition display apparatus at a high yield.

As a result, in the display apparatus 31, in order that the setting of the first to fifth periods are cyclically repeated, each pixel 33 of the pixel unit 32 is driven by the horizontal driving circuit 35 and the vertical driving circuit 34. During the light-emission period T11, which is a first period, the transistors TR1 and TR3 are set to an off state and an on state in accordance with the writing signal WS and the driving pulse signal DS, respectively. Then, the transistor TR2 drives the organic EL element 8 in accordance with an electric current value corresponding to the gate-source voltage Vgs resulting from by the potential difference across both ends of the signal level holding capacitor C1 in order to cause the organic EL element 8 to emit light.

During the subsequent second period T12, the transistor TR3 is set to an off state in response to the driving signal DS, and the light emission of the organic EL element 8 is stopped.

Furthermore, during the subsequent third period T13, the transistor TR5 is set to an on state in accordance with the control signal AZ2, and the other end of the signal level holding capacitor C1 is set to the fixed potential Vini.

During the subsequent fourth period T14, the transistor TR1 is set to an on state in response to the writing signal WS, and one end of the signal level holding capacitor C1 is set to the fixed potential Vofs. Furthermore, during the period of time in which the predetermined fixed potential Vofs is repeated a plurality of times in the signal line SIG, the transistor TR1 is set to an on state in response to the writing signal WS. During the period of each fixed potential Vofs, the driving pulse signal DS is made to rise, and the potential difference across a ends of the signal level holding capacitor C1 is set to a voltage that is approximately equal to the threshold voltage Vth of the transistor TR2. This makes it possible to prevent variations in the light-emission luminance in each pixel.

As a result, in the display apparatus, the voltage between the terminals of the signal level holding capacitor C1 is gradually brought closer to the threshold voltage Vth of the transistor TR2 so that even if the wiring patterns related to the fixed potential Vofs and the transistor TR4 (FIG. 19) are omitted, it is possible to reliably set the threshold voltage Vth of the transistor TR2 in the signal level holding capacitor C1 in order to prevent variations in the light-emission luminance.

During the subsequent fifth period T15, the transistor TR1 is set from an on state to an off state in response to the writing signal WS, and the signal level Vsig of the signal line SIG is set in one end of the signal level holding capacitor C1. Thereafter, the transistor TR3 is set to an on state in response to the driving pulse signal DS.

During the period T15, if the driving pulse signal DS is made to rise before the writing signal WS is made to fall, it is possible to prevent variations in the light-emission luminance due to variations in the mobility of the transistor TR2.

Advantages of the Embodiments

According to the above-described configuration, the gate voltage Vg of the transistor TR2 for driving the light-emitting element 8 is set to the fixed potential Vofs, and variations in the light-emission luminance due to variations in the threshold voltage Vth of the transistor TR2 are corrected, so that the fixed potential Vofs is supplied from the signal line SIG side. As a result, it is possible to reduce the number of scanning lines and the number of wiring patterns of fixed potentials in comparison with a known case.

Furthermore, after the transistor TR3 is set to an on state in response to the driving pulse signal DS, the transistor TR1 is set to an off state in response to the writing signal WS after a predetermined period of time passes. As a result, it is possible to prevent variations in the light-emission luminance due to variations in the mobility of the transistor TR2.

By forming all the transistors of the pixel circuit and the driving circuit by N-channel transistors on an insulating substrate with an amorphous silicon process, it is possible to manufacture a display apparatus with simple and easy steps.

Second Embodiment

Figure 13:
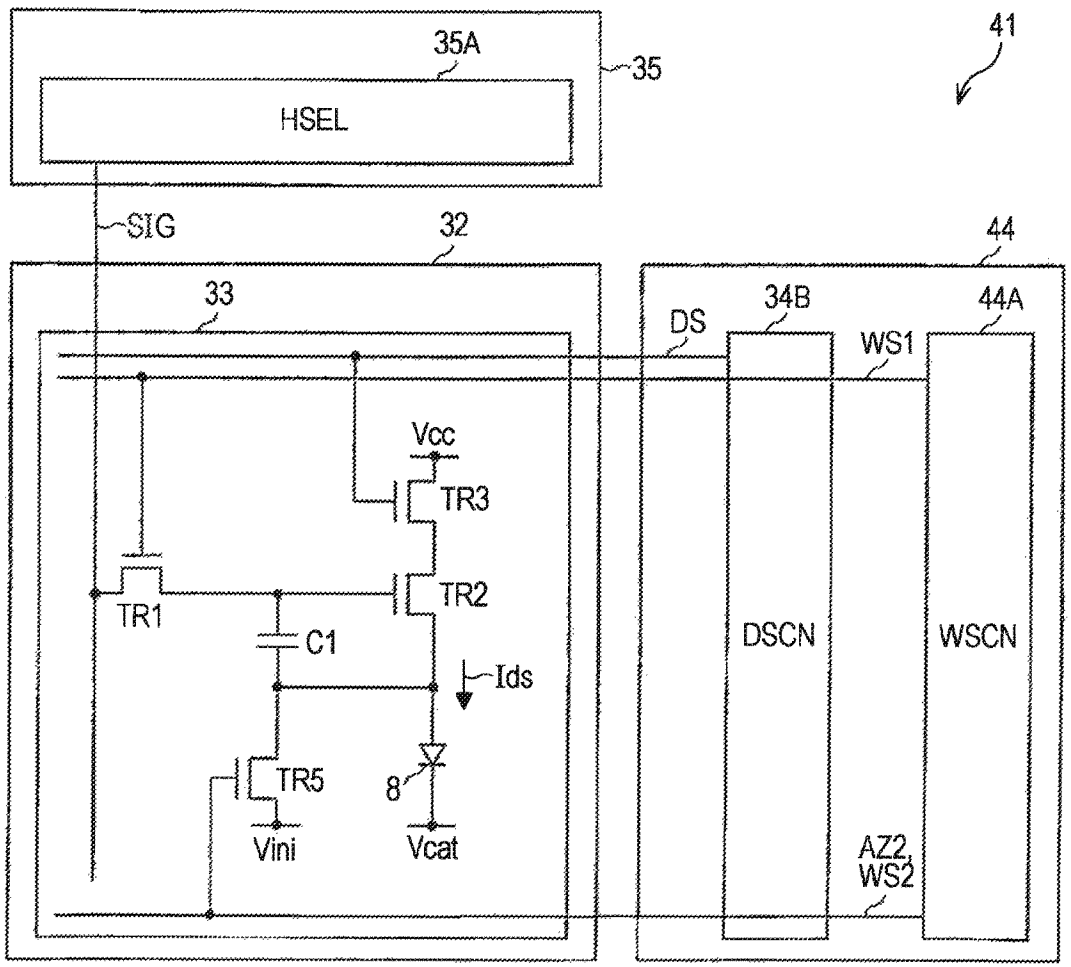
FIG. 13 is a block diagram showing a display apparatus according to a second embodiment of the present invention.

FIG. 13, in contrast with FIG. 1, is a block diagram showing a display apparatus according to a second embodiment of the present invention. A display apparatus 41 is configured in the same manner as the display apparatus 31 according to the first embodiment except that the configuration for the control signal AZ2 differs.

Figure 14:
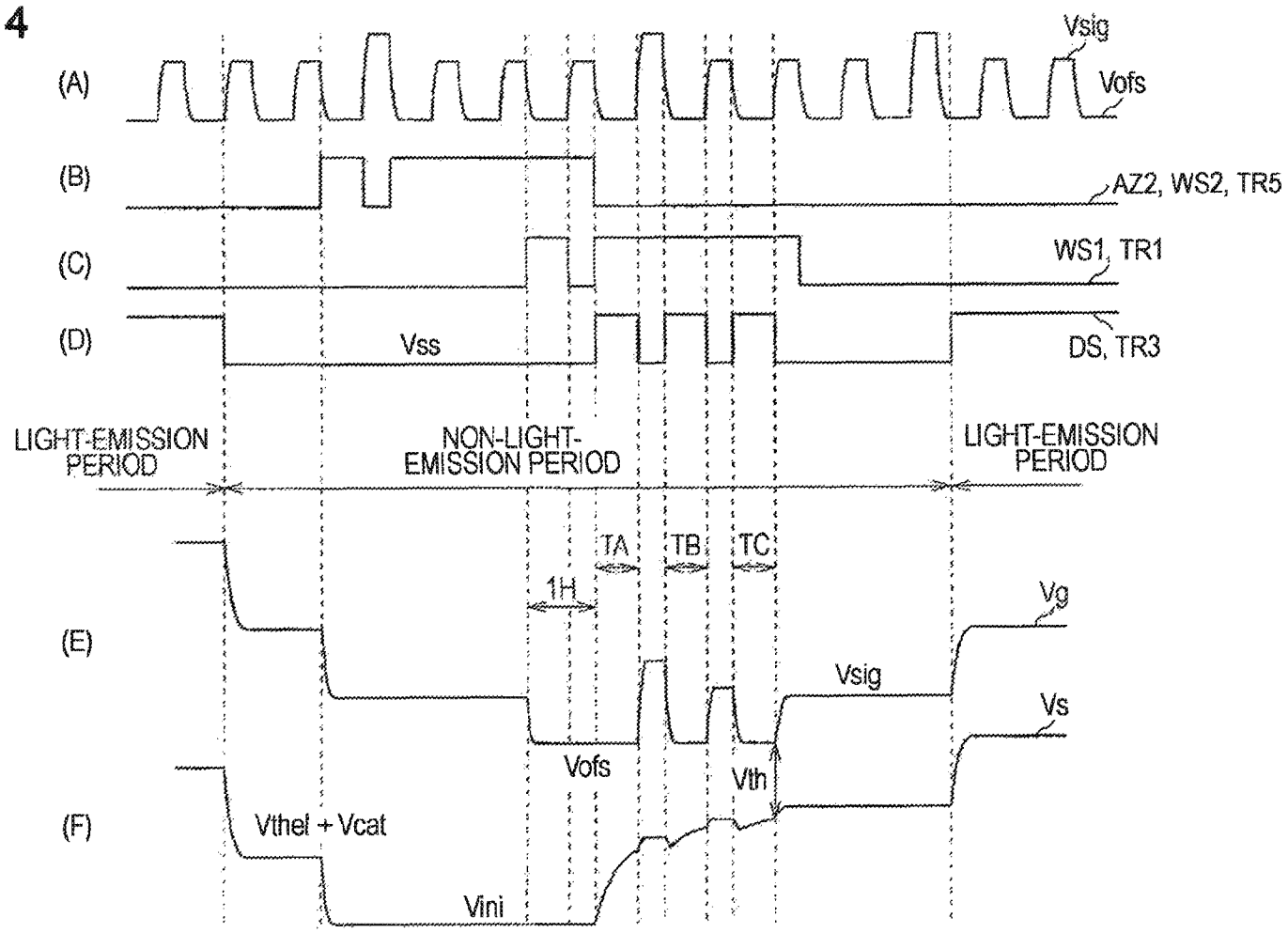
FIG. 14 is a timing chart of the display apparatus shown in FIG. 13.

In the display apparatus 41, a control signal generation circuit is omitted in a vertical driving circuit 44, and a control signal AZ2 is generated by a write scanning circuit 44A. Here, as shown in FIG. 14, the write scanning circuit 44A outputs, as a control signal AZ2, a writing signal WS2 to be output to the pixel 33 preceding by a plurality of lines through the wiring to the scanning lines of the pixel unit 32. Therefore, a writing signal WS for one line is output as a writing signal from the write scanning circuit 44A to the corresponding pixel 33, and also, is output as a control signal AZ2 to the pixel 33 preceding by a plurality of lines.

As a result, in the display apparatus 41, the configuration of the vertical driving circuit 44 is simplified. Thus, the display apparatus 41 can be configured to be a so-called narrow frame.

In the manner described above, the writing signal WS2 to be output to the pixel 33 preceding by a plurality of lines is used as a control signal AZ2. In the vertical driving circuit 44, in order that the control signal AZ2 and the writing signal WS do not rise simultaneously during the period of time in which the signal level of the signal line SIG is held at the signal level Vsig corresponding to the pixel 33, the signal level of the writing signal WS is made to rise during the period of time in which the signal level of the signal line SIG has been set to the fixed potential Vofs. Thereafter, for a fixed period of time, the signal level of the writing signal WS is made to fall during the period of time in which the signal level of the signal line SIG is held at the signal level Vsig corresponding to the pixel 33.

As a result, in the display apparatus 41, the transistor TR1 is made so as not to be turned on in a state in which the transistor TR5 has been set to an on state in response to the control signal AZ2, thereby preventing variations in the gate-source voltage Vgs of the transistor TR2 in accordance with the signal level Vsig corresponding to the pixel of the signal line SIG.

That is, when the transistor TR1 is turned on in a state in which the transistor TR5 has been set to an on state in response to the control signal AZ2, the gate voltage of the transistor TR2 is charged to a signal level Vsig different for each pixel. When the signal level of the signal line SIG reaches the fixed potential Vofs next, the gate-source voltage Vgs of the transistor TR2 is represented by the following equation:

$$Vgs=Vofs-Vini+((C1+C2)/(Cel+C1+C2))\times(Vofs-Vsig) \quad (6)$$

Therefore, in this case, the voltage between the terminals of the signal level holding capacitor C1 immediately before the threshold voltage Vth of the transistor TR2 that is set in the signal level holding capacitor C1 is varied in accordance with the signal level Vsig of the signal line SIG.

More specifically, when the signal level Vsig of the signal level SIG is a low voltage on the black side, the voltage (Vsig−Vofs) in equation (6) may take a negative value. In this case, the gate-source voltage Vgs of the transistor TR2 becomes a voltage lower than the voltage (Vofs−Vss). Therefore, even if the fixed potential Vofs has been set so that (Vofs−Vss)>Vth, when the setting of the threshold voltage Vth of the signal level holding capacitor C1 is started, the gate-source voltage Vgs of the transistor TR2 becomes smaller than or equal to the threshold voltage Vth. Therefore, it is difficult to correctly set the threshold voltage Vth in the signal level holding capacitor C1. As a result, the gate-source voltage Vgs of the transistor TR2 in accordance with the signal level Vsig corresponding to the pixel of the signal line SIG varies.

According to the configuration shown in FIG. 13, by using the writing signal WS2 to be output to the pixel 33 preceding by a plurality of lines as a control signal AZ2, it is possible to simplify the configuration of the vertical driving circuit.

At this time, during the period of time in which the signal level of the signal line SIG is held at the signal level Vsig corresponding to the pixel 33, the writing signal WS is generated so that the control signal AZ2 and the writing signal WS do not rise simultaneously. As a result, it is possible to reliably set the threshold voltage Vth of the transistor TR2 in the signal level holding capacitor in order to reliably prevent variations in the light-emission luminance due to variations in the threshold voltage Vth.

Third Embodiment

In the above-described embodiments, a case in which light-emitting elements using an organic EL element are driven with electric current has been described. The present invention is not restricted to such a case and can be widely applied to a display apparatus using various current-driven light-emitting elements.

Figure 29:
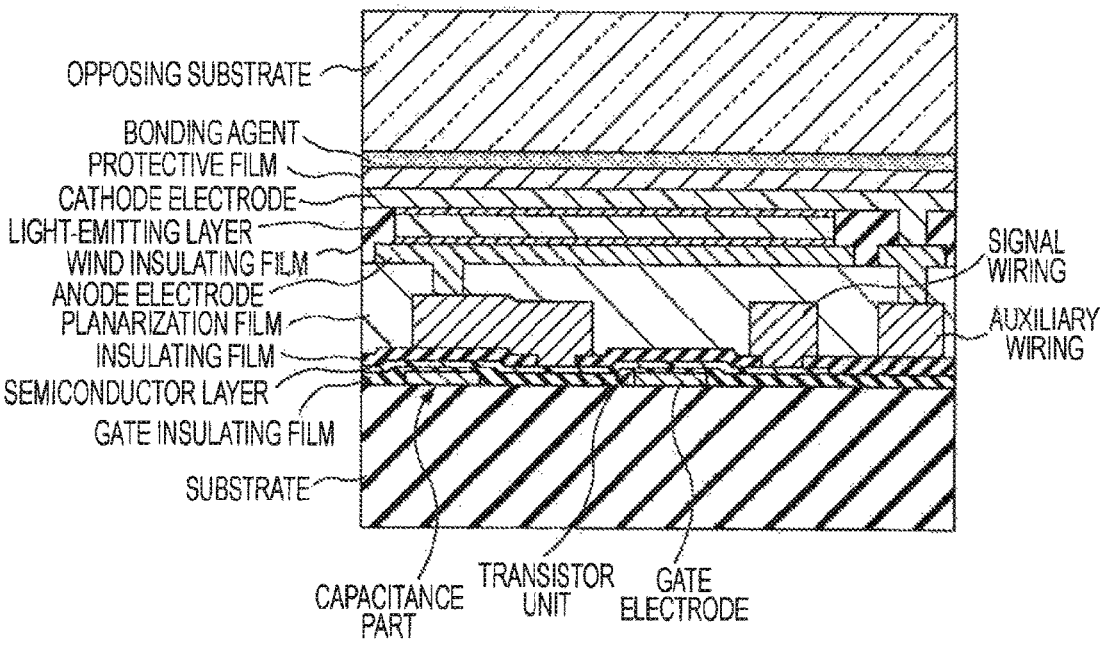
FIG. 29 is a sectional view showing the device configuration of a display apparatus according to an embodiment of the present invention.

A display apparatus according to an embodiment of the present invention has a thin-film device configuration as shown in FIG. 29. FIG. 29 shows a schematic cross-sectional structure of a pixel formed on an insulating substrate. As shown in FIG. 29, the pixel includes a transistor unit (one TFT is shown as an example) including a plurality of thin-film transistors, a capacitance unit, such as a holding capacitance, and a light-emission unit, such as an organic EL element. The transistor unit and the capacitance unit are formed on a substrate with a TFT process, and the light-emission unit, such as an organic EL element, is laminated thereon. A transparent opposing substrate is bonded thereon via a bonding agent so as to be formed as a flat panel.

Figure 30:
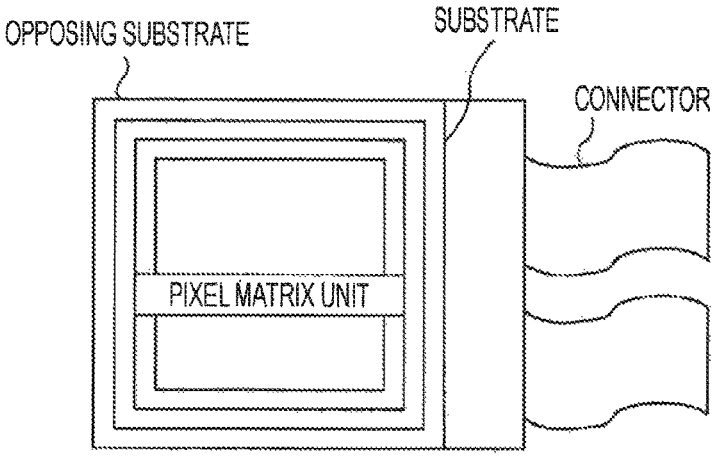
FIG. 30 is a plan view showing the module configuration of a display apparatus according to an embodiment of the present invention.

As shown in FIG. 30, the display apparatus according to the embodiment of the present invention includes a flat module-shaped display apparatus. For example, on an insulating substrate, a pixel array unit in which pixels formed of an organic EL element, a thin-film transistor, a thin-film capacitance, and the like are integrated in a matrix pattern is provided. A bonding agent is applied in such a manner as to surround the pixel array unit (pixel matrix unit), and an opposing substrate, such as glass, is bonded thereon, thereby forming a display module. A color filter, a protective film, a light-shielding film, and the like may be provided on the transparent opposing substrate as necessary. As a connector for inputting or outputting signals from the outside to the pixel array unit, for example, a FPC (flexible printed circuit) may be provided in the display module.

The display apparatus according to any of the above-described embodiments of the present invention has a flat panel shape and can be applied to displays of various electronic apparatuses, more specifically, displays of electronic apparatuses of various fields for displaying video signals input to or generated by the apparatus in a form of image or video. Examples of such electronic apparatuses include a digital camera, a notebook personal computer, a mobile phone, and a video camera. Hereinafter, these examples are described.

Figure 31:
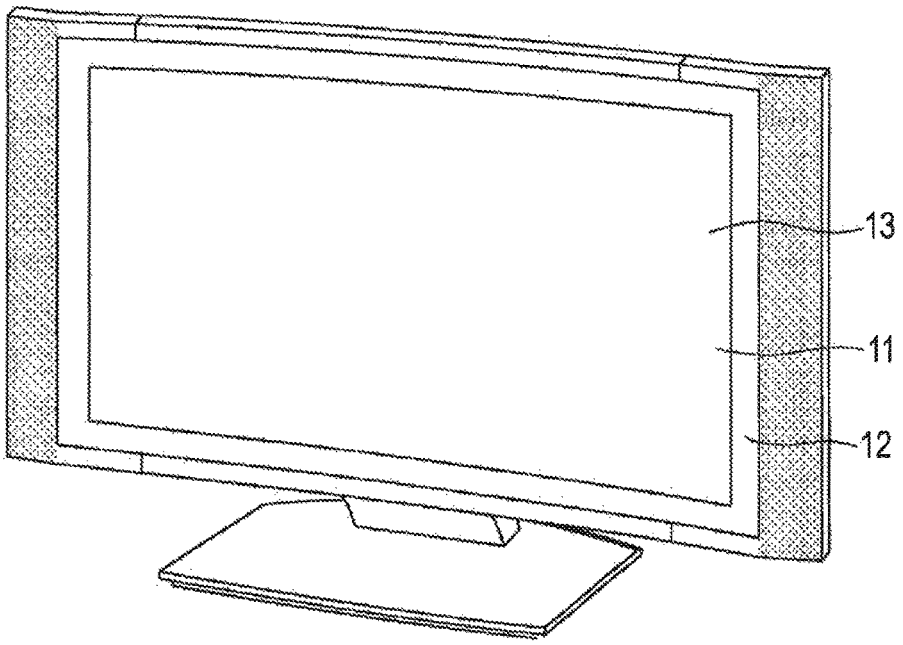
FIG. 31 is a perspective view showing a television set including a display apparatus according to an embodiment of the present invention.

FIG. 31 shows a television set to which the display apparatus according to any of the embodiments of the present invention is applied. The television set includes a video display screen 11 formed of a front panel 12, a filter glass 13, and the like. The television set is manufactured by using the display apparatus according to any of the embodiments of the present invention as the video display screen 11.

Figure 32:
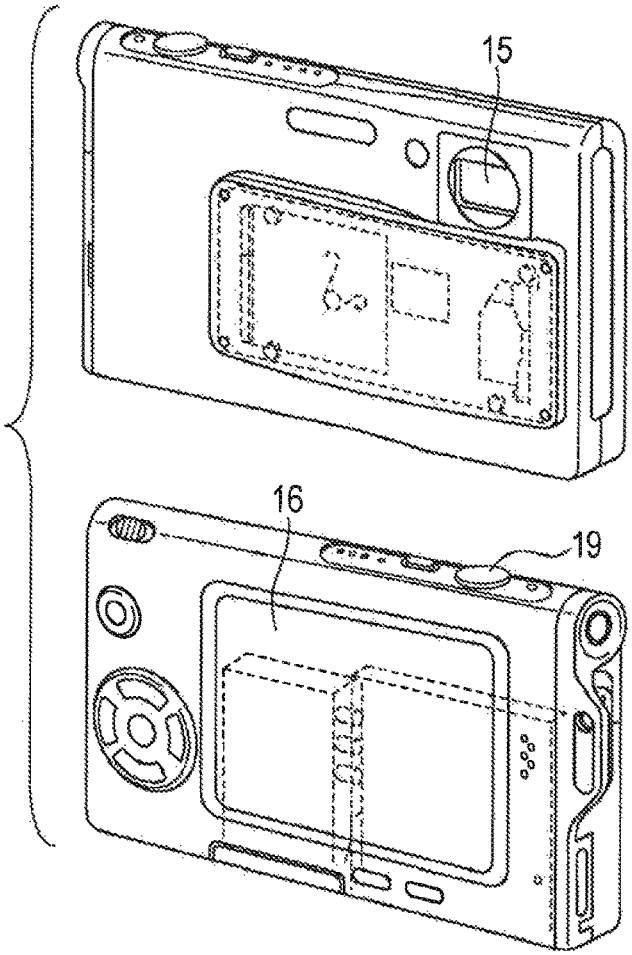
FIG. 32 is a perspective view showing a digital still camera including a display apparatus according to an embodiment of the present invention.

FIG. 32 shows a digital camera to which the present invention is applied. The upper part is a front view, and the lower part is a back view. The digital camera includes an image-capturing lens, a light-emission unit 15 for flash, a display unit 16, a control switch, a menu switch, a shutter 19, and the like. The digital camera is manufactured by using the display apparatus according to any of the embodiments of the present invention as the display unit 16.

Figure 33:
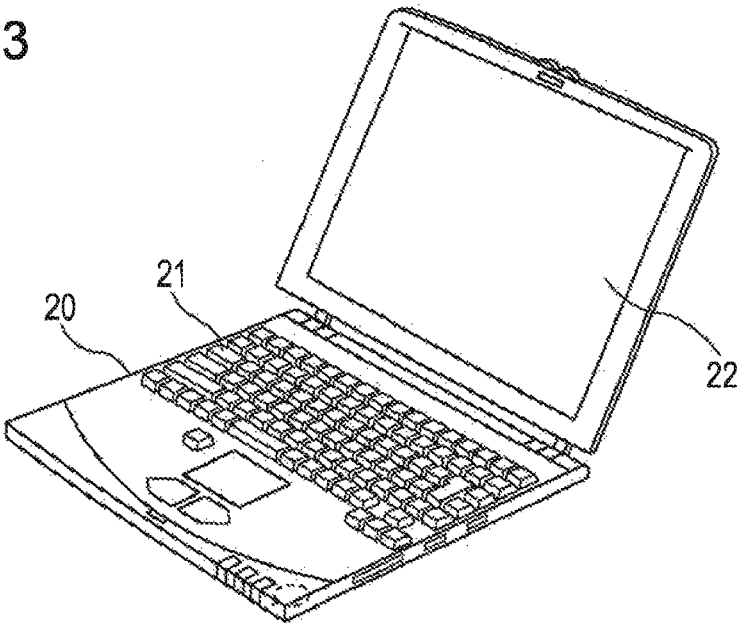
FIG. 33 is a perspective view showing a notebook personal computer including a display apparatus according to an embodiment of the present invention.

FIG. 33 shows a notebook personal computer to which the display apparatus according to any of the embodiments of the present invention is applied. A main unit 20 of the notebook personal computer includes a keyboard 21 that is operated to input characters and so on. A main unit cover includes a display unit 22 for displaying images. The notebook personal computer is manufactured by using the display apparatus according to any of the embodiments of the present invention as the display unit 22.

Figure 34:
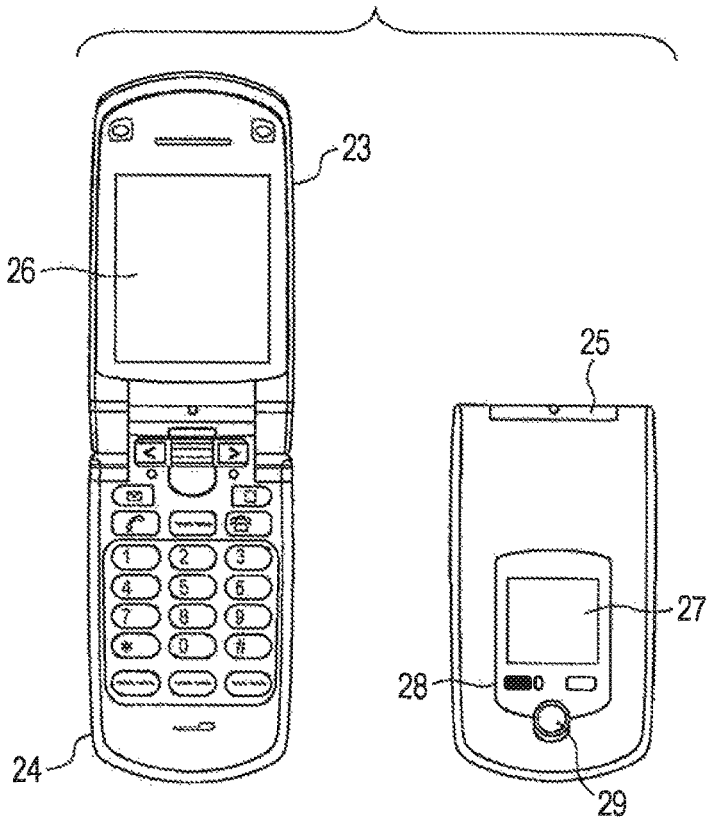
FIG. 34 is a schematic view showing a portable terminal device including a display apparatus according to an embodiment of the present invention.

FIG. 34 shows a portable terminal device to which the display apparatus according to any of the embodiments of the present invention is applied. The left part shows an open state, and the right part shows a closed state. The portable terminal device includes an upper casing 23, a lower casing 24, a connection unit (hinge unit) 25, a display unit 26, a subdisplay unit 27, a picture light 28, a camera 29, and the like. The portable terminal device is manufactured by using the display apparatus according to any of the embodiments of the present invention as the display unit 26 and the subdisplay unit 27.

Figure 35:
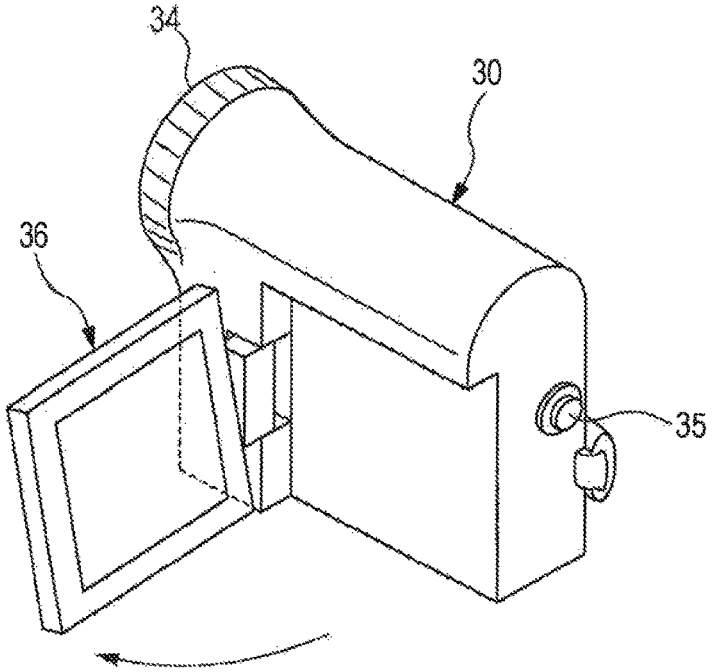
FIG. 35 is a perspective view showing a video camera including a display apparatus according to an embodiment of the present invention.

FIG. 35 shows a video camera to which the display apparatus according to any of the embodiments of the present invention is applied. The video camera includes a main unit 30, a lens 34 for capturing an image data subject, which is provided on the side facing the front side, an image-capturing start/stop switch 35, a monitor 36, and the like. The video camera is manufactured by using the display apparatus according to any of the embodiments of the present invention as the monitor 36.

It should be understood by those skilled in the art that various modifications, combinations, subcombinations and alterations may occur depending on design requirements and other factors insofar as they are within the scope of the appended claims or the equivalents thereof.

What is claimed is:

[1. A display apparatus comprising:

a pixel unit in which pixels are arranged in a matrix pattern; and a driving circuit for driving the pixel unit, wherein each of the pixels includes a capacitor;

a first transistor that is turned on/off in response to a writing signal and via which one end of the capacitor is connected to a signal line;

a second transistor;

a light-emitting element which is connected to the second transistor;

a third transistor that is turned on/off in response to a driving pulse signal and via which the drain of the second transistor is connected to a power-supply voltage; and a fourth transistor that is turned on/off in response to a control signal and that sets the other end of the signal level holding capacitor to a first fixed potential, and wherein the driving circuit sequentially sets the signal level of the signal line to a signal level and a second fixed potential, wherein during the period of time in which the signal level of the signal line is set to the second fixed potential, sets the third transistor to an on state.]

[2. The electronic apparatus including the display apparatus according to claim 1.]

*3. A display apparatus comprising:*

*a pixel unit in which pixels are arranged in a matrix pattern; and*

*a driving circuit for driving the pixel unit,*

*wherein each of the pixels includes*

*a signal level holding capacitor;*

*a first transistor that is turned on/off in response to a writing signal and via which one end of the signal level holding capacitor is connected to a signal line;*

*a second transistor;*

*a light-emitting element which is connected to the second transistor;*

*a third transistor that is turned on/off in response to a driving pulse signal and via which a drain of the second transistor is connected to a power-supply voltage;*

*a fourth transistor that is turned on/off in response to a control signal and that sets an other end of the signal level holding capacitor to a first fixed potential; and*

*a fifth transistor which is connected to the light-emitting element,*

*wherein the driving circuit sequentially sets a signal level of the signal line to a signal level potential and a second fixed potential, and*

*wherein during a period of time in which the signal level of the signal line is set to the second fixed potential, the driving circuit sets the third transistor to an on state.*

*4. A display apparatus comprising:*

*a pixel unit in which pixels are arranged in a matrix pattern; and*

*a driving circuit for driving the pixel unit,*

*wherein each of the pixels includes*

*a signal level holding capacitor;*

*a first transistor that is turned on/off in response to a writing signal and via which one end of the signal level holding capacitor is connected to a signal line;*

*a second transistor;*

*a third transistor that is turned on/off in response to a driving pulse signal and via which a drain of the second transistor is connected to a power-supply voltage;*

*a fourth transistor that is turned on/off in response to a control signal and that sets an other end of the signal level holding capacitor to a first fixed potential; and*

*a light-emitting element which is connected to the second transistor and the fourth transistor,*

*wherein the driving circuit sequentially sets a signal level of the signal line to a signal level potential and a second fixed potential,*

*wherein during a period of time in which the signal level of the signal line is set to the second fixed potential, the driving circuit sets the third transistor to an on state, and*

*wherein, during a period of time in which the third transistor turned off, the fourth transistor is turned on two times.*

*5. The display apparatus according to claim 4, wherein a gate of the second transistor is connected to the one end of the signal level holding capacitor.*

*6. The display apparatus according to claim 4, wherein a source of the second transistor is connected to the other end of the signal level holding capacitor.*

*7. The display apparatus according to claim 4, wherein a gate of the second transistor is connected to the one end of the signal level holding capacitor, a source of the second transistor is connected to the other end of the signal level holding capacitor.*

*8. The display apparatus according to claim 4, wherein the driving circuit includes a vertical driving circuit configured to output the writing signal, the driving pulse signal, and the control signal.*

*9. The display apparatus according to claim 8, wherein the driving circuit includes a horizontal driving circuit configured to sequentially sets a signal level of a signal line connecting to the first transistor to a gray-scale level and the second fixed potential.*

*10. The display apparatus according to claim 4, wherein each of the first transistor, the second transistor, the third transistor, and the fourth transistor is N-channel transistor.*

*11. The display apparatus according to claim 4, wherein the pixel unit and the driving circuit are arranged on an insulating substrate.*

*12. The display apparatus according to claim 11, wherein the pixel unit and the driving circuit are formed on the insulating substrate with an amorphous silicon process.*

*13. An electronic apparatus including the display apparatus according to claim 4.*

* * * * *